United States Patent
Wang et al.

(10) Patent No.: US 12,256,381 B2
(45) Date of Patent: Mar. 18, 2025

(54) TECHNIQUES FOR TRANSMITTING A CANCELLATION INDICATION

(71) Applicant: QUALCOMM Incorporated, San Diego, CA (US)

(72) Inventors: Xiaojie Wang, Hillsborough, NJ (US); Xiaoxia Zhang, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 392 days.

(21) Appl. No.: 17/695,412

(22) Filed: Mar. 15, 2022

(65) Prior Publication Data

US 2023/0319818 A1     Oct. 5, 2023

(51) Int. Cl.
| | |
|---|---|
| *H04W 72/1268* | (2023.01) |
| *H04W 24/08* | (2009.01) |
| *H04W 72/20* | (2023.01) |
| *H04W 72/566* | (2023.01) |

(52) U.S. Cl.
CPC ....... *H04W 72/1268* (2013.01); *H04W 24/08* (2013.01); *H04W 72/20* (2023.01); *H04W 72/569* (2023.01)

(58) Field of Classification Search
None
See application file for complete search history.

(56) References Cited

U.S. PATENT DOCUMENTS

| | | | | |
|---|---|---|---|---|
| 11,849,461 | B2 * | 12/2023 | Chatterjee | H04W 8/24 |
| 2019/0306877 | A1 * | 10/2019 | Wang | H04L 5/0087 |
| 2021/0014866 | A1 * | 1/2021 | Shi | H04W 80/08 |
| 2021/0144708 | A1 * | 5/2021 | Wang | H04W 72/0453 |
| 2021/0258974 | A1 | 8/2021 | Hosseini et al. | |

FOREIGN PATENT DOCUMENTS

| | | | |
|---|---|---|---|
| WO | WO-2020113010 A1 | 6/2020 | |
| WO | WO-2021035392 A1 | 3/2021 | |

OTHER PUBLICATIONS

International Search Report and Written Opinion—PCT/US2023/014218—ISA/EPO—May 23, 2023.

* cited by examiner

*Primary Examiner* — Diane L Lo
(74) *Attorney, Agent, or Firm* — Holland & Hart LLP

(57) ABSTRACT

Methods, systems, and devices for wireless communications are described. A user equipment (UE) may receive a downlink message indicating a set of resources on which an uplink message is scheduled to be transmitted by the UE. The UE may identify a scheduling conflict with at least a portion of the set of resources, where the scheduling conflict may arise between the uplink message and a second communication at the UE. A network entity may for a cancellation indication indicating that transmission of the uplink message on at least a portion of the set of resources is preempted based at least in part on a scheduling conflict at the UE. The UE may transmit a cancellation indication to indicate that transmission of the uplink message on at least the portion of the set of resources is preempted based on the scheduling conflict.

30 Claims, 17 Drawing Sheets

TECHNIQUES FOR TRANSMITTING A CANCELLATION INDICATION

FIELD OF TECHNOLOGY

The following relates to wireless communications, including techniques for transmitting a cancellation indication.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

A UE functioning within a wireless communication system may perform a variety of operations such as communicating, positioning, sensing, measuring, and collecting data among other operations. The operations performed by the UE may be associated with a priority such that a more urgent task may be performed before other tasks. As part of the operations performed by the UE, a network entity may schedule the UE for uplink transmission. However, the network entity may be unaware of one or more tasks and/or the corresponding task priorities at the UE which may lead to scheduling conflicts and increased latency.

SUMMARY

The described techniques relate to improved methods, systems, devices, and apparatuses that support techniques for transmitting a cancellation indication. For example, the described techniques provide for a user equipment (UE) to cancel scheduled uplink resources. The UE may receive a downlink message (e.g., a downlink control information (DCI) message) scheduling resources for one or more uplink messages. If the UE has a scheduling conflict with one or more of the uplink messages, the UE may transmit a cancellation indication either prior to the one or more uplink messages or after the one or more uplink messages. A network entity may receive the cancellation indication and adjust decoding of the uplink message accordingly, where the adjustment may be based on whether the UE transmits the cancellation indication prior to or after the one or more uplink messages. The cancellation indication may include a portion of scheduled resources the UE canceled (e.g., preempted), a cause (e.g., a reason) for cancellation, one or more updated uplink transmission parameters, a time period during which uplink transmissions may be suspended, or any combination thereof.

A method for wireless communications at a UE is described. The method may include receiving a downlink message indicating a set of resources on which an uplink message is scheduled to be transmitted by the UE, identifying a scheduling conflict with at least a portion of the set of resources, the scheduling conflict arising between the uplink message and a second communication at the UE, and transmitting, by the UE, a cancellation indication associated with at least the portion of the set of resources based on the scheduling conflict.

An apparatus for wireless communications is described. The apparatus may include a processor, memory coupled with the processor, and instructions stored in the memory. The instructions may be executable by the processor to cause the apparatus to receive a downlink message indicating a set of resources on which an uplink message is scheduled to be transmitted by a UE, identify a scheduling conflict with at least a portion of the set of resources, the scheduling conflict arising between the uplink message and a second communication at the UE, and transmit, by the UE, a cancellation indication associated with at least the portion of the set of resources based on the scheduling conflict.

Another apparatus for wireless communications is described. The apparatus may include means for receiving a downlink message indicating a set of resources on which an uplink message is scheduled to be transmitted by a UE, means for identifying a scheduling conflict with at least a portion of the set of resources, the scheduling conflict arising between the uplink message and a second communication at the UE, and means for transmitting, by the UE, a cancellation indication associated with at least the portion of the set of resources based on the scheduling conflict.

A non-transitory computer-readable medium storing code for wireless communications is described. The code may include instructions executable by a processor to receive a downlink message indicating a set of resources on which an uplink message is scheduled to be transmitted by a UE, identify a scheduling conflict with at least a portion of the set of resources, the scheduling conflict arising between the uplink message and a second communication at the UE, and transmit, by the UE, a cancellation indication associated with at least the portion of the set of resources based on the scheduling conflict.

In some examples of the method, apparatuses, and non-transitory computer-readable medium described herein, transmitting the cancellation indication may include operations, features, means, or instructions for transmitting the cancellation indication prior to the uplink message, the cancellation indication being an uplink cancellation indication (ULCI).

In some examples of the method, apparatuses, and non-transitory computer-readable medium described herein, transmitting the cancellation indication may include operations, features, means, or instructions for transmitting the cancellation indication based on a duration between a last symbol of the cancellation indication and a first symbol of the uplink message satisfying a range, the range having a lower threshold and an upper threshold.

In some examples of the method, apparatuses, and non-transitory computer-readable medium described herein, the lower threshold may be based on a decoding and processing capability of a network entity.

In some examples of the method, apparatuses, and non-transitory computer-readable medium described herein, the upper threshold may be a maximum duration between the cancellation indication and the uplink message.

In some examples of the method, apparatuses, and non-transitory computer-readable medium described herein, transmitting the cancellation indication may include operations, features, means, or instructions for transmitting the cancellation indication prior to the uplink message based on the UE being configured to prioritize transmitting the cancellation indication prior to the uplink message rather than after.

In some examples of the method, apparatuses, and non-transitory computer-readable medium described herein, transmitting the cancellation indication may include operations, features, means, or instructions for transmitting the cancellation indication after the uplink message, the cancellation indication being an uplink pre-emption indication (ULPI).

In some examples of the method, apparatuses, and non-transitory computer-readable medium described herein, transmitting the cancellation indication may include operations, features, means, or instructions for transmitting the cancellation indication based on a duration between a last symbol of the uplink message and a first symbol of the cancellation indication satisfying a threshold.

In some examples of the method, apparatuses, and non-transitory computer-readable medium described herein, the threshold may be based on a defined duration for a network entity to monitor for the cancellation indication.

Some examples of the method, apparatuses, and non-transitory computer-readable medium described herein may further include operations, features, means, or instructions for receiving an indication of a configuration for transmitting the cancellation indication, where transmitting the cancellation indication may be based on the configuration.

In some examples of the method, apparatuses, and non-transitory computer-readable medium described herein, the configuration indicates the cancellation indication may be transmitted prior to the uplink message, after the uplink message, or either.

In some examples of the method, apparatuses, and non-transitory computer-readable medium described herein, the configuration indicates one or more timing parameters associated with transmitting the cancellation indication with respect to the uplink message.

In some examples of the method, apparatuses, and non-transitory computer-readable medium described herein, transmitting the cancellation indication may include operations, features, means, or instructions for transmitting the cancellation indication as uplink control information included in the uplink message.

In some examples of the method, apparatuses, and non-transitory computer-readable medium described herein, transmitting the cancellation indication may include operations, features, means, or instructions for transmitting an indication of a reason for canceling transmission of at least the portion of the set of resources of the uplink message, the reason being the second communication.

In some examples of the method, apparatuses, and non-transitory computer-readable medium described herein, transmitting the cancellation indication may include operations, features, means, or instructions for transmitting an indication of the set of resources on which transmission of the uplink message is canceled, the indication including one or more time resources, one or more frequency resources, or a combination thereof.

In some examples of the method, apparatuses, and non-transitory computer-readable medium described herein, transmitting the cancellation indication may include operations, features, means, or instructions for transmitting an indication of a period that the UE will refrain from transmitting the uplink message on the at least the portion of the set of resources.

In some examples of the method, apparatuses, and non-transitory computer-readable medium described herein, transmitting the cancellation indication may include operations, features, means, or instructions for transmitting the cancellation indication on a set of uplink control channel resources dedicated to the cancellation indication of an uplink control channel.

Some examples of the method, apparatuses, and non-transitory computer-readable medium described herein may further include operations, features, means, or instructions for receiving a signal indicating a set of uplink control channel resources for transmitting the cancellation indication, the set of uplink control channel resources being periodic resources.

In some examples of the method, apparatuses, and non-transitory computer-readable medium described herein, transmitting the cancellation indication may include operations, features, means, or instructions for transmitting the cancellation indication by multiplexing the cancellation indication with uplink control information an uplink control channel, the uplink control information including channel state information, feedback information, or both.

In some examples of the method, apparatuses, and non-transitory computer-readable medium described herein, transmitting the cancellation indication may include operations, features, means, or instructions for transmitting an indication of an updated set of one or more transmission parameters updated by the UE, the updated set of one or more transmission parameters including a packet size, a modulation and coding scheme, or both, where the updated set of one or more transmission parameters may be updated from a respective one or more transmission parameters included in a downlink control information message.

Some examples of the method, apparatuses, and non-transitory computer-readable medium described herein may further include operations, features, means, or instructions for receiving an indication of a threshold priority to use in determining whether to refrain from uplink transmissions, where transmitting the cancellation indication may be based on the uplink message may have a priority less than the threshold priority.

Some examples of the method, apparatuses, and non-transitory computer-readable medium described herein may further include operations, features, means, or instructions for transmitting the uplink message on a remaining portion of resources scheduled for the uplink message, the remaining portion of resources not canceled by the UE.

Some examples of the method, apparatuses, and non-transitory computer-readable medium described herein may further include operations, features, means, or instructions for communicating in accordance with the second communication on at least the portion of the set of resources.

In some examples of the method, apparatuses, and non-transitory computer-readable medium described herein, the cancellation indication includes 14 bits.

In some examples of the method, apparatuses, and non-transitory computer-readable medium described herein, the second communication may be associated with a higher priority than the uplink message.

In some examples of the method, apparatuses, and non-transitory computer-readable medium described herein, the second communication may be associated with positioning, measurements, sensing, sidelink communications, Wi-Fi communications, Bluetooth communications, or a combination thereof.

A method for wireless communications at a network entity is described. The method may include transmitting a downlink message indicating a set of resources on which an uplink message is scheduled to be transmitted by a UE, monitoring for a cancellation indication associated with at least a portion of the set of resources based on a scheduling conflict at the UE, and receiving the cancellation indication based on monitoring for the cancellation indication.

An apparatus for wireless communications is described. The apparatus may include a processor, memory coupled with the processor, and instructions stored in the memory. The instructions may be executable by the processor to cause the apparatus to transmit a downlink message indicating a set of resources on which an uplink message is scheduled to be transmitted by a UE, monitor for a cancellation indication associated with at least a portion of the set of resources based on a scheduling conflict at the UE, and receive the cancellation indication based on monitoring for the cancellation indication.

Another apparatus for wireless communications is described. The apparatus may include means for transmitting a downlink message indicating a set of resources on which an uplink message is scheduled to be transmitted by a UE, means for monitoring for a cancellation indication associated with at least a portion of the set of resources based on a scheduling conflict at the UE, and means for receiving the cancellation indication based on monitoring for the cancellation indication.

A non-transitory computer-readable medium storing code for wireless communications is described. The code may include instructions executable by a processor to transmit a downlink message indicating a set of resources on which an uplink message is scheduled to be transmitted by a UE, monitor for a cancellation indication associated with at least a portion of the set of resources based on a scheduling conflict at the UE, and receive the cancellation indication based on monitoring for the cancellation indication.

In some examples of the method, apparatuses, and non-transitory computer-readable medium described herein, receiving the cancellation indication may include operations, features, means, or instructions for receiving the cancellation indication prior to the uplink message, the cancellation indication being a ULCI.

In some examples of the method, apparatuses, and non-transitory computer-readable medium described herein, receiving the cancellation indication may include operations, features, means, or instructions for receiving the cancellation indication in a range between a last symbol of the cancellation indication and a first symbol of the uplink message, the range having a lower threshold and an upper threshold.

In some examples of the method, apparatuses, and non-transitory computer-readable medium described herein, the lower threshold may be based on a decoding and processing capability of the network entity.

In some examples of the method, apparatuses, and non-transitory computer-readable medium described herein, the upper threshold may be a maximum duration between the cancellation indication and the uplink message.

In some examples of the method, apparatuses, and non-transitory computer-readable medium described herein, receiving the cancellation indication may include operations, features, means, or instructions for receiving the cancellation indication after the uplink message, the cancellation indication being a ULPI.

In some examples of the method, apparatuses, and non-transitory computer-readable medium described herein, receiving the cancellation indication may include operations, features, means, or instructions for receiving the cancellation indication in accordance with a threshold duration between a last symbol of the uplink message and a first symbol of the cancellation indication.

In some examples of the method, apparatuses, and non-transitory computer-readable medium described herein, the threshold duration may be based on a defined duration for the network entity to monitor for the cancellation indication.

Some examples of the method, apparatuses, and non-transitory computer-readable medium described herein may further include operations, features, means, or instructions for transmitting an indication of a configuration for transmitting the cancellation indication but the UE, where monitoring for the cancellation indication may be based on the configuration.

In some examples of the method, apparatuses, and non-transitory computer-readable medium described herein, the configuration indicates the cancellation indication may be transmitted prior to the uplink message, after the uplink message, or either.

In some examples of the method, apparatuses, and non-transitory computer-readable medium described herein, the configuration indicates one or more timing parameters associated with transmitting the cancellation indication with respect to the uplink message.

In some examples of the method, apparatuses, and non-transitory computer-readable medium described herein, receiving the cancellation indication may include operations, features, means, or instructions for receiving the cancellation indication as uplink control information included in the uplink message.

In some examples of the method, apparatuses, and non-transitory computer-readable medium described herein, receiving the cancellation indication may include operations, features, means, or instructions for receiving an indication of a reason for canceling transmission of at least the portion of the set of resources of the uplink message.

In some examples of the method, apparatuses, and non-transitory computer-readable medium described herein, receiving the cancellation indication may include operations, features, means, or instructions for receiving an indication of the set of resources on which transmission of the uplink message is canceled, the indication including one or more time resources, one or more frequency resources, or a combination thereof.

In some examples of the method, apparatuses, and non-transitory computer-readable medium described herein, receiving the cancellation indication may include operations, features, means, or instructions for receiving an indication of a period that the UE will refrain from transmitting the uplink message on the at least the portion of the set of resources.

In some examples of the method, apparatuses, and non-transitory computer-readable medium described herein, receiving the cancellation indication may include operations, features, means, or instructions for receiving the cancellation indication on a set of uplink control channel resources dedicated to the cancellation indication of an uplink control channel.

Some examples of the method, apparatuses, and non-transitory computer-readable medium described herein may further include operations, features, means, or instructions for transmitting a signal indicating a set of uplink control channel resources for transmitting the cancellation indication, the set of uplink control channel resources being periodic resources.

In some examples of the method, apparatuses, and non-transitory computer-readable medium described herein, receiving the cancellation indication may include operations, features, means, or instructions for receiving the cancellation indication multiplexed with uplink control information on an uplink control channel, the uplink control information including channel state information, feedback information, or both.

In some examples of the method, apparatuses, and non-transitory computer-readable medium described herein, receiving the cancellation indication may include operations, features, means, or instructions for receiving an indication of an updated set of one or more transmission parameters updated by the UE, the updated set of one or more transmission parameters including a packet size, a modulation and coding scheme, or both, where the updated set of one or more transmission parameters may be updated from a respective one or more transmission parameters included in a downlink control information message.

Some examples of the method, apparatuses, and non-transitory computer-readable medium described herein may further include operations, features, means, or instructions for updating a decoding procedure of the network entity for decoding the uplink message based on the indication of the updated set of one or more transmission parameters.

Some examples of the method, apparatuses, and non-transitory computer-readable medium described herein may further include operations, features, means, or instructions for transmitting an indication of a threshold priority for the UE to use in determining whether to refrain from uplink transmissions, where receiving the cancellation indication may be based on the uplink message may have a priority less than the threshold priority.

Some examples of the method, apparatuses, and non-transitory computer-readable medium described herein may further include operations, features, means, or instructions for receiving the uplink message on a remaining portion of resources scheduled for the uplink message, the remaining portion of resources not canceled by the UE.

Some examples of the method, apparatuses, and non-transitory computer-readable medium described herein may further include operations, features, means, or instructions for determining to refrain from decoding the set of resources of the uplink message based on the cancellation indication.

Some examples of the method, apparatuses, and non-transitory computer-readable medium described herein may further include operations, features, means, or instructions for reassigning the set of resources based on the cancellation indication.

In some examples of the method, apparatuses, and non-transitory computer-readable medium described herein, the cancellation indication includes 14 bits.

DETAILED DESCRIPTION

Figure 1:
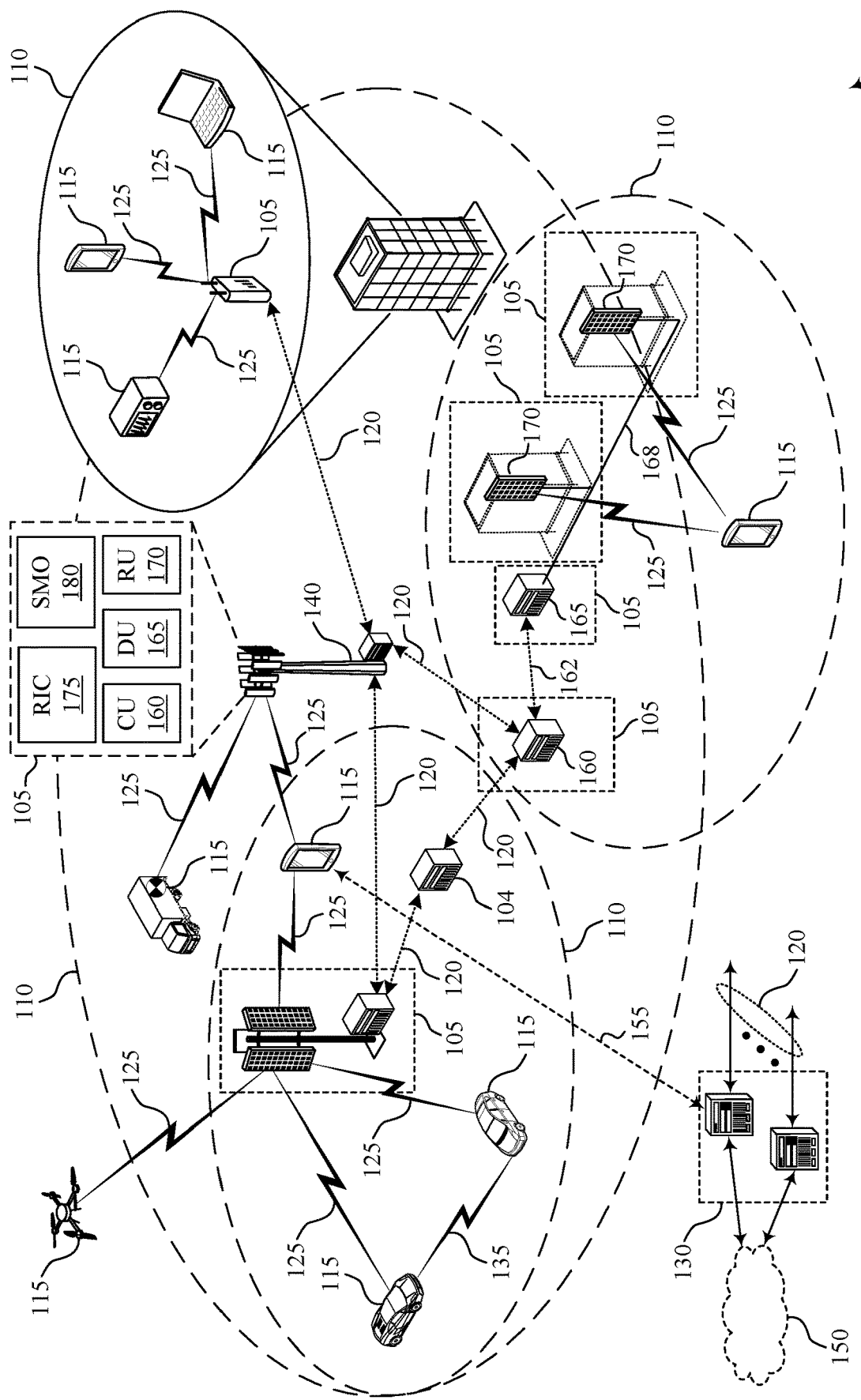
FIG. 1 illustrates an example of a wireless communications system that supports techniques for transmitting a cancellation indication in accordance with one or more aspects of the present disclosure.

In some wireless communication systems, a communication device (e.g., user equipment (UE)) may perform a multitude of functions. For example, the UE may perform communications, positioning, sensing, measurements, and data collection functions. In some cases, a priority may exist among the functions performed by the UE. For example, transmitting an urgent sidelink communication (e.g., public safety information) may be prioritized over a measurement operation. In other examples, an operation such as object detection or performing measuring of a neighboring cell for hand-over may be prioritized over transmitting a sidelink communication. In some cases, the UE may be scheduled, by the network entity, to transmit an uplink message, where the network entity may not consider and/or be able to identify other schedulings at the UE. For example, the UE may be scheduled to transmit an uplink message in a set of resources, but the UE may be configured to perform another task (e.g., a higher priority task) in the same or in overlapping resources of the set of resources. In some cases, the UE may be unable to cancel the uplink message and thus may transmit the uplink message in the set of resources and delay performing the higher priority task until after the UE transmits the scheduled uplink message. In some cases, this may lead to increased latency and decreased reliability at the UE.

To improve flexibility at the UE, the UE may be configured to cancel at least a portion of a scheduled uplink message (e.g., physical uplink shared channel (PUSCH)) that overlaps with one or more resources of another task (e.g., a high priority task) to be performed by the UE in order for the UE to perform the high priority task. To do so, the UE may transmit a cancellation indication (e.g., an uplink cancellation indication (ULCI), an uplink cancellation preemption indication (ULPI)) to the network entity that indicates that the UE canceled (e.g., preempted) at least the portion of the scheduled uplink message. For example, the cancellation indication may indicate one or more canceled resources of the scheduled uplink message. In some cases, the UE may indicate to the network entity that the UE will not transmit at least the portion of the scheduled uplink message by transmitting an ULCI prior to the scheduled uplink message. Accordingly, the network entity may reallocate the canceled resources to a different UE and/or for a different purpose. In some cases, the UE may indicate to the network entity that one or more of the scheduled uplink resources were not used for the uplink message by transmitting an ULPI after the scheduled uplink message. In this case, the network entity may either decode the received uplink message again (ignoring the canceled portion) or ignore the canceled portion during a first decoding process if the uplink message had not yet been decoded by the network entity at the time of receiving the ULPI. In some cases, the UE may be configured to transmit a cancellation indication in a portion of the scheduled uplink message (e.g., in the scheduled PUSCH). In some examples, the UE may be configured with a configuration for transmitting the cancellation indication. For example, the UE may be configured to transmit the cancellation indication before the scheduled uplink message, after the scheduled uplink message, with the scheduled uplink message, etc. In another example, the UE may be configured with a set of resources for transmitting the cancellation indication. In another example, the UE may be configured with a time window during which a cancellation indication may be transmitted to ensure that the network entity has adequate time in which to receive and process the ULCI or ULPI.

Particular implementations of the subject matter described herein may be implemented to realize one or more of the following potential advantages. In some implementations, for example, the UE may experience greater freedom. For example, the UE may be able to decide to transmit or cancel a scheduled uplink message depending on additional constraints at the UE. Additionally, the UE may experience enhanced in-device coexistence. Such techniques may provide for increased functionality and optimization, among other advantages. As such, supported techniques may include improved network operations and, in some examples, may promote network efficiencies, among other benefits.

Aspects of the disclosure are initially described in the context of wireless communications systems. Aspects are the described with reference to communication timelines and a process flow. Aspects of the disclosure are further illustrated by and described with reference to apparatus diagrams, system diagrams, and flowcharts that relate to techniques for transmitting a cancellation indication.

FIG. 1 illustrates an example of a wireless communications system 100 that supports techniques for transmitting a cancellation indication in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocols). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for transmitting a cancellation indication as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In wireless communication system 100, a network entity 105 may schedule communications between the UE 115 and the network entity 105. In some cases, the network entity 105 may determine to cancel a scheduled uplink resource in order to improve high priority communications, such as ultra-reliable low latency communications (URLLC). In some cases, the UE 115 may be configured to receive a ULCI (e.g., DCI 2_4). Accordingly, the network entity 105 may cancel PUSCH transmissions, PUSCH repetitions, sounding reference signals (SRSs), etc., in favor of a higher priority communication by transmitting a ULCI to the UE 115. For example, the network entity 105 may cancel a scheduled enhanced mobile broadband (eMBB) PUSCH resource by transmitting an ULCI to the UE 115. The ULCI may indicate time and frequency resources of the resource block that are canceled.

The network entity 105 may monitor for a cancellation indication such as the ULPI 410. When the network entity 105 receives the PUSCH 420, the network entity 105 may decode the ULPI 410 and the uncanceled portion of PUSCH 420 while ignoring the canceled portion 415. In such cases, the network entity 105 may be unable to reallocate the canceled portion of resources 415.

A DCI 2_4 payload may indicate a set of one or more resources being preempted. In one example, the DCI 2_4 may include a 14 bit payload per serving cell. A time and frequency resource region may be RRC configured. For example, a first symbol in $T_{C1}$ is $T'_{proc,2}$ after a last symbol of DCI 2_4. A payload may indicate what portion of time and frequency resources shall be canceled. A UE 115 may not expect to cancel a symbol starting earlier than $T_{proc,2}$ after the last symbol of a CORESET detecting DCI 2_4.

In some cases, the network entity 105 may cancel downlink resources of a scheduled downlink message after the downlink message. For example, the UE 115 may receive a scheduled downlink message (e.g., physical downlink shared channel (PDSCH)), and then receive a downlink preemption indication (DLPI) (e.g., a DCI 2_1) that indicates a portion of the received PDSCH is canceled. If the UE 115 already processed the scheduled downlink message, the UE 115 may process the downlink message again with the canceled portion omitted. If the UE 115 did not yet process the PDSCH, the UE 115 may be process the PDSCH for a first time without the canceled portion. A DLPI may allow fast scheduling of URLLC traffic in the downlink. For example, a network entity 105 may pre-empt an ongoing (eMBB) PDSCH transmission. A UE 115 may be configured to monitor for a DLPI in next slot of the eMBB PDSCH, and the UE 115 may discard PDSCH resources that are pre-empted as indicated in the DLPI via DCI 2_1.

In some cases, it may be beneficial for the UE 115, rather than the network entity 105, to cancel scheduled uplink resources. The UE 115 may perform a multitude of functions such as communications with one or more devices (e.g., Wi-Fi, Bluetooth, sidelink, network entity), positioning (e.g., with infrastructure nodes or other communication nodes), sensing (e.g., object detection), measuring (e.g., for performing hand-over or multi-RAT measurement), and collecting data (e.g., for machine learning and artificial intelligence model training). The multitude of tasks performed by the UE 115 may create scheduling constraints. For example, the UE 115 may support performing both uplink and sidelink communications and be scheduled to transmit an uplink message. However, at the time of the scheduled transmission, the UE 115 may have a high priority task to perform such as transmitting an urgent sidelink message (e.g., public safety information). In some implementations, the UE 115 may be configured to still transmit the scheduled uplink message even though it may be more beneficial to use the resources to perform a different task, such as the urgent sidelink message.

The techniques, methods, devices, and apparatuses described herein provide for uplink cancellation by the UE 115. Accordingly, a UE 115 may determine whether to cancel a scheduled uplink message in favor of performing another task, such as a higher priority task. In some cases, the UE may transmit a cancellation prior to the scheduled uplink message, with a portion of the uplink message, or after the uplink message. For example, a network entity 105 may configure a UE 115 with physical uplink control channel (PUCCH) resources for transmitting a ULCI in one or more time resources before a scheduled PUSCH, where the ULCI may indicate a portion of the scheduled PUSCH resources that the UE 115 canceled. The network entity 105 may activate one or more ULCI configured resources (e.g., the PUCCH resources) through control signaling (e.g., RRC, MAC-CE, DCI) in a semi-static, semi-persistent, or aperiodic manner. In some cases, upon receiving the ULCI, the network entity 105 may reallocate the canceled PUSCH resources to a different UE and/or for a different purpose. Alternatively, the UE 115 may cancel a portion of the scheduled PUSCH resources by transmitting a ULPI in one or more time resources after the scheduled PUSCH. In such cases, the network entity 105 may receive what it believes to be the scheduled PUSCH, and may then receive the ULPI indicative that at least a portion of the PUSCH resources were not used for the PUSCH. If the network entity 105 already been decoded the received PUSCH at the time of receiving the ULPI, the network entity 105 may decode the received PUSCH again without considering the canceled portion. Otherwise, the network entity 105 may ignore the canceled portion of the PUSCH when initially decoding the PUSCH. In some cases, the ULCI or ULPI may be multiplexed with other uplink control information (UCI) that is transmitted on a corresponding PUCCH resource. In some implementations, the UE 115 may be configured to transmit the cancellation indication (e.g., a ULPI, a ULCI) in a portion of the scheduled PUSCH.

In some cases, the UE 115 may be configured to transmit the ULCI or ULPI within a defined time window (e.g., threshold, range). For example, the UE 115 may be configured to transmit a ULCI in accordance with a timing condition (e.g., constraint, requirement, rule) that allows the receiving network entity 105 with adequate time to process the ULCI and reassign the corresponding canceled portion of PUSCH resources. The timing condition may also ensure that the network entity 105 is able to monitor for ULCI messages corresponding to the correct PUSCH occasion. Similarly, the UE 115 may be configured with a timing condition associated with transmitting a ULPI that defines a time window during which the network entity 105 may monitor for a ULPI request.

The UE 115 may be configured to format the ULCI and/or ULPI as a 14 bit UCI message that indicates which symbols and resources blocks of the scheduled PUSCH may be canceled. The cancellation indication may also include an indication of why the scheduled resources are being canceled (e.g., a reason, a cause). Additionally, or alternatively, the cancellation indication may also include an indication of an intent to suspend uplink transmission for a period of time so that the UE 115 may perform other tasks (e.g., higher priority tasks, critical tasks). In some cases, the cancellation indication may include updated uplink transmission parameters.

Figure 2:
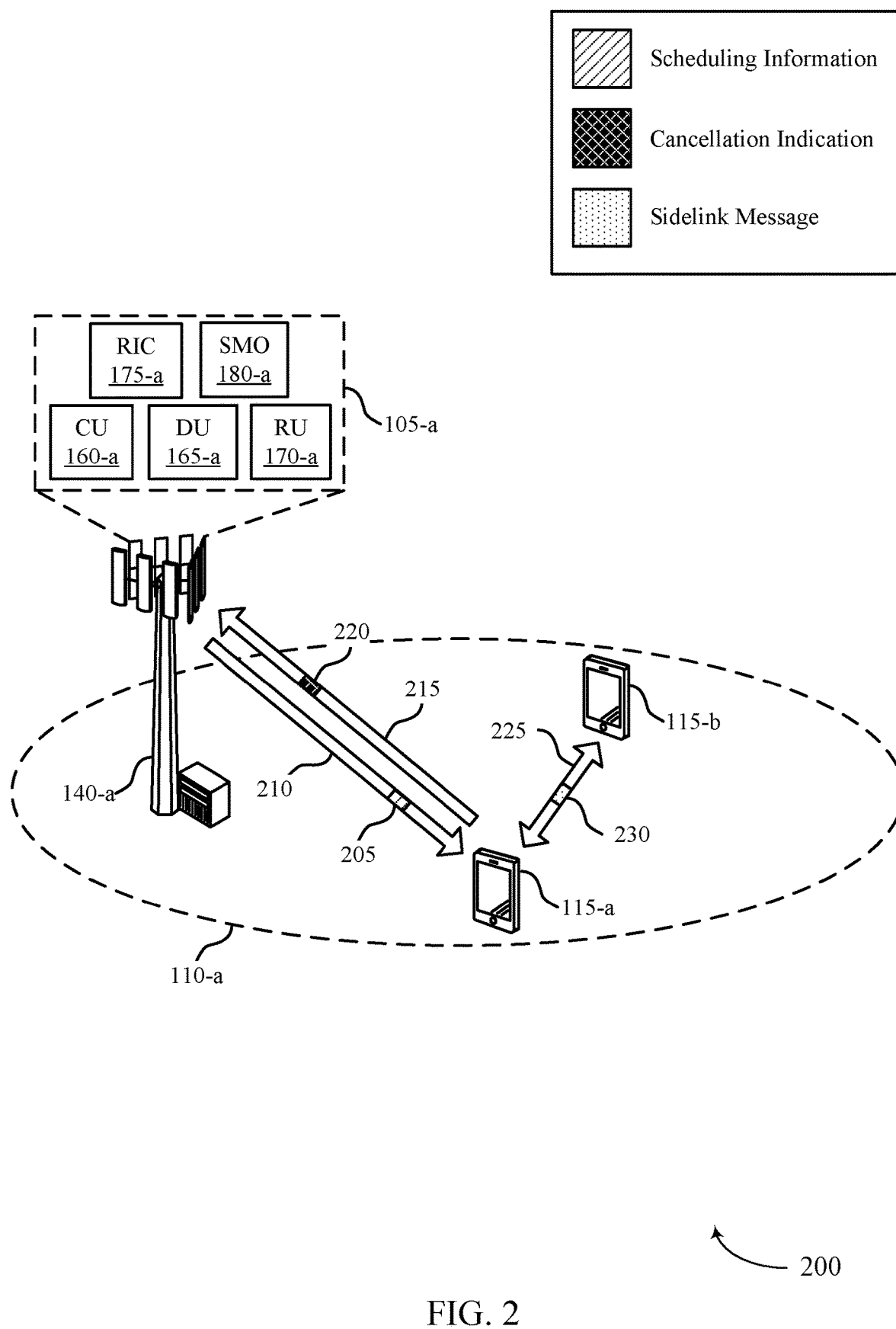
FIG. 2 illustrates an example of a wireless communication system that supports techniques for transmitting a cancellation indication in accordance with one or more aspects of the present disclosure.

FIG. 2 illustrates an example of a wireless communications system 200 that supports techniques for transmitting a cancellation indication in accordance with one or more aspects of the present disclosure. The wireless communications system 200 may implement or be implemented by aspects of the wireless communications system 100. For example, the wireless communications system 200 may include a UE 115-a, a UE 115-b, and a network entity 105-a, which may be examples of corresponding devices described with reference to FIG. 1. The UEs 115 and the network entity 105-a may communicate within a coverage area 110-a, which may be an example of a coverage area 110 described with reference to FIG. 1. In the wireless communications system 200, the UE 115-a may transmit a sidelink message 230 to the UE 115-b and a cancellation indication 220 to the network entity 105-a.

As described with reference to FIG. 1, the network entity 105-a may include an RIC 175-a, a SMO 180-a, a CU 160-a, a DU 165-a, an RU 170-a, a base station 140-a, or a combination thereof. Communications between the network entity 105-a and the UE 115-a may refer to communications between the UE 115-a and any portion (e.g., entity, sub-entity) of the network entity 105-a. In the following description of the wireless communications system 200, the terms "transmitting," "receiving," or "communicating," when referring to the network entity 105-a, may refer to any portion of the network entity 105-a (e.g., the base station 140-a, the CU 160-a, the DU 165-a, the RU 170-a) communicating with the UE 115-a (e.g., directly or via one or more other network entities 105).

In the example of FIG. 2, the UE 115-a may communicate with the network entity 105-a via one or more Uu links, such as a downlink communication link 210 and an uplink communication link 215. Additionally, or alternatively, the UE 115-a and the UE 115-b may communicate over a PC5 interface such as a sidelink communication link 225.

In some cases, the network entity 105-a may schedule the UE 115-a with uplink resources to transmit an uplink message. In some cases, however, it may be beneficial for the network entity 105-a to cancel at least a portion of the scheduled uplink resources. For example, the network entity 105-a may cancel a previously scheduled enhanced mobile broadband (eMBB) PUSCH resource, in favor of a higher priority transmission such as when resources are not available for transmitting a high priority PUSCH in order to decrease latency of the higher priority transmission (e.g., a URLLC transmission). As such, the network entity 105-a may cancel a low priority PUSCH resource and use the resources for transmitting a high priority PUSCH. The network entity 105-a may cancel resources by configuring the UE 115-a with a parameter (e.g., uplinkCancellationPriority) that indicates for the UE 115-a to monitor for a ULCI. Cancelling the low priority PUSCH may include cancelling repetitions of the PUSCH as well as sounding reference signals (SRSs) related to the PUSCH. In some cases, the ULCI may be included in a downlink control information (DCI) message (e.g., configured grant (GC) physical downlink control channel (PDCCH) DCI 2_4 using channel information (CI) radio network temporary identifier (RNTI)).

Additionally, or alternatively, the network entity 105-a may cancel a scheduled physical downlink shared channel (PDSCH) to increase scheduling efficiency of URLLC traffic. For example, the network entity 105-a may transmit a downlink preemption indication (DLPI) (e.g., via DCI 2_1) that is received at the UE 115-a after the associated PDSCH. The UE 115-a may be configured to monitor for a DLPI in a time slot after a received PDSCH. As such, the DLPI may indicate a portion of the received PDSCH that should be discarded when decoding. In some cases, this may mean decoding the PDSCH again if the UE 115 decoded the PDSCH prior to receiving the DLPI. While cancellation indication by the network entity 105-a may be beneficial for scheduling in some applications, in other applications the network entity 105-a may not be able to take into account scheduling constraints at the UE 115-a which may lead to increased latency at the UE 115-a.

For example, a UE 115-a may be scheduled to communicate with UE 115-b over a sidelink communication link 225 which may conflict with scheduled uplink transmissions scheduled over uplink communication link 215. The UE 115-a may receive scheduling information 205 (e.g., uplink scheduling information, downlink scheduling information, or a combination thereof) based on buffer status reports (BSRs) transmitted from the UE 115-a. For example, the UE 115-a may maintain separate buffers corresponding to uplink data and sidelink data and may transmit, to the network entity 105-a, separate buffer status reports that indicate the amount of data available for the respective transmission types. As such, the network entity 105-a may schedule uplink and sidelink communications separately (e.g., separate control messages corresponding to each buffer) based on the separate BSRs and not take into account conflicts or constraints between the two communication types. Additionally, or alternatively, the network entity 105_a may use different DCI formats and/or RRC messages to schedule uplink and sidelink traffic and the UE 115-a may not use an uplink grant to transmit sidelink traffic, even if the priority of the sidelink traffic is high (e.g., public safety information). In some cases, the UE may be unable to cancel the uplink message and thus may transmit the uplink message in the set of resources and delay performing the higher priority task until after the UE transmits the scheduled uplink message. In some cases, this may lead to increased latency and decreased reliability at the UE.

To improve flexibility at the UE, the UE 115-a may be configured with techniques to cancel a scheduled uplink transmission in order to perform other high priority tasks (e.g., transmitting urgent sidelink message, positioning, data collection) that conflict with the uplink transmission. For example, the UE 115-a may be configured to monitor for scheduling conflicts between tasks (e.g., uplink communications, sidelink communication, positioning, measuring) and upon identifying a scheduling conflict, the UE 115-a may be configured to refrain from performing at least one of the tasks associated with the conflict. In some cases, the UE 115-a may determine which tasks to cancel based on respective priorities of the tasks. If the UE 115-a determines to cancel all or a portion of a scheduled uplink message to a network entity 105-a in favor of performing another high priority task, the UE 115-a may be configured to transmit a cancellation indication 220 to the network entity 105-a. The cancellation indication 220 may serve to indicate that at least a portion of the resources associated with the scheduled uplink message will be or were used by the UE 115-a to perform the other task. In some cases, the network entity 105-a may configure the UE 115-a with periodic resources (e.g., periodic PUCCH resources) for transmitting a cancellation indication 220. In some cases, the network entity 105-a may activate the configured resources using control signaling (e.g., RRC, MAC-CE, or DCI) transmitted to the UE 115-a in a semi-static, semi-persistent, or aperiodic manner. In some cases, the network entity 105-a may specify a cancellation priority. For example, the network entity 105-a may indicate a priority threshold to the UE 115-a such that if an uplink scheduling priority associated with a scheduled uplink message is higher than the configured threshold, the UE 115-a may not transmit the cancellation indication 220 and is to transmit the uplink message as scheduled despite the conflict. However, if the uplink message is associated with a priority lower than the threshold, the UE 115-a may determine whether to cancel the uplink message in response to a scheduling conflict, such as based on the respective priorities of the conflicting tasks.

In some cases, the UE 115-a may cancel one or more PUSCH resources indicated in the scheduling information before the scheduled PUSCH transmission. For example, the UE 115-a may transmit a cancellation indication 220 (e.g., ULCI) to the network entity 105-a over the uplink communication link 215 before transmitting the scheduled PUSCH, as described in more detail with reference to FIG. 3. In some cases, the UE 115-a may transmit a cancellation indication 220 (e.g., ULPI) to the network entity 105-a over the uplink communication link 215 after transmitting the scheduled PUSCH, as described in more detail with reference to FIG. 3. In some cases, the UE 115-a may multiplex the cancellation indication 220 with other UCI (e.g., channel state information (CSI) report, hybrid automatic repeat request (HARQ)) and may transmit the multiplexed message via one or more PUCCH resources. In some other cases, the UE 115-a may transmit the cancellation indication 220 as part of the scheduled PUSCH, a portion of which may be canceled, as described in more detail with reference to FIG. 4.

In some cases, cancellation indication 220 may be represented as a 14 bit message. The cancellation indication 220 may be associated with a resource block group and may indicates which resources are canceled (e.g., symbols, resource blocks). Specifically, the cancellation indication 220 may inform the network entity 105-a one or more symbols (e.g., OFDM symbols) in the time domain are canceled and/or one or more resource blocks in the frequency domain are canceled. In some cases, the cancellation indication 220 may also include a cause for cancellation (e.g., a reason) such as a need to transmit an urgent sidelink packet or perform a low latency positioning (e.g., PRS for positioning), or measurement task. Additionally, or alternatively, the UE 115-a may determine to suspend uplink transmissions for a period of time such as when the UE 115-a has other critical tasks to perform. Accordingly, the cancellation indication 200 may include an indication of the time period for suspending uplink transmissions. For example, the UE 115-a may determine a high priority task that is to be performed periodically during the conflicting resources. Accordingly, to solve the current conflict and future periodic conflicts with the set of resources, the UE 115-a may preemptively indicate to the network entity 105-a not to schedule future transmissions in the set of periodic resources because the UE 115-a will cancel them if the network entity 105 does.

Additionally, or alternatively, the UE 115-a may determine to update uplink transmission parameters. For example, the UE 115_a may receive scheduling information 205 (e.g., PUSCH scheduling information included in DCI) which may indicate uplink transmission parameters based on information at the network entity 105-a. Accordingly, the UE 115-a is to use the uplink transmission parameters in accordance with the scheduling information. In some cases, however, the UE 115-a may have more up to date information related to channel conditions and the packet. For example, if the channel conditions are better than the network entity 105-a predicted, it may be beneficial for the UE 115-a to use a higher modulation and coding scheme that has fewer required resources. Accordingly, the UE 115-a may indicate an updated modulation and coding scheme in the cancellation indication 220. Similarly, the UE 115-a may determine that is beneficial to transmit with a smaller packet size than the scheduled uplink packet size. As such, the UE 115-a may cancel a portion of the resources in the cancellation indication 220 and transmit with the smaller uplink packet.

The network entity 105-a may receive the cancellation indication 220 and adjust scheduling and/or decoding accordingly. For example, if the cancellation indication 220 is received before the scheduled uplink message, the network entity 105-a may reallocate the canceled resources to another device, for other purposes, etc. For example, in some cases, the network entity 105-a may monitor uplink occasions during a time period prior to the scheduled uplink message to determine if the scheduled uplink message is canceled before decoding a received PUSCH. If the cancellation indication 220 is detected, the network entity 105-a may skip decoding the PUSCH and, additionally, or alternatively, recycle the PUSCH resources for other transmissions. If the cancellation indication 220 is received after the scheduled uplink message, the network entity 105-a may decode the uplink transmission with the canceled portion omitted (e.g., the network entity 105-a may ignore the canceled portion). For example, in some cases, the network entity 105-a may monitor uplink occasions during a time period after receiving a PUSCH, where the network entity 105-a may refrain from decoding the received PUSCH until after the time period. Therefore, if the network entity 105-a receives the cancellation indication 220 in the time period, then the network entity 105-a may skip decoding at least the canceled portion of the received PUSCH.

Figure 3:
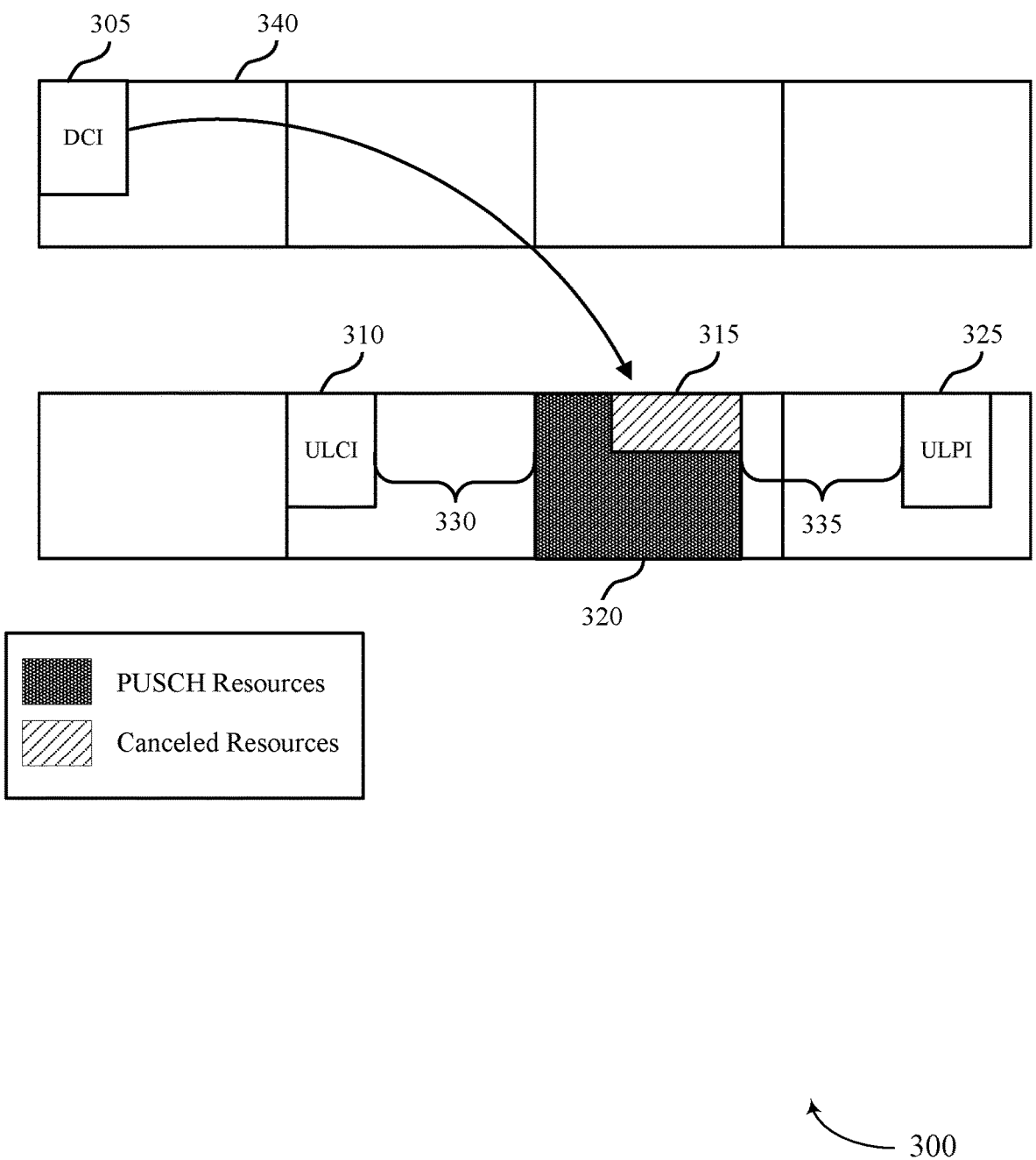
FIG. 3 illustrates an example of a communication timeline that supports techniques for transmitting a cancellation indication in accordance with one or more aspects of the present disclosure.

FIG. 3 illustrates an example of a communication timeline 300 that supports techniques for transmitting a cancellation indication in accordance with one or more aspects of the present disclosure. The communication timeline 300 may implement or be implemented by aspects of the wireless communications system 100 and 200. For example, the communication timeline 300 may include transmission of downlink control information 305 by a device which may be an example of network entity 105 described with reference to FIGS. 1 and 2. The ULCI 310 and ULPI 325 may be examples of cancellation indication 220 as described with reference to FIG. 2. The device that transmits the cancellation indication and PUSCH 320 may be an example of UE 115 described with reference to FIGS. 1 and 2.

As shown in FIG. 3, the network entity 105 may transmit a DCI message 305 that schedules PUSCH resources 320 in a resource 340 (e.g., a time resource, frequency resource, or both). In some implementations, the UE 115 may be configured and/or determine to transmit a ULCI 310 to indicate that a portion of resources 315 within PUSCH 320 are canceled. The UE 115 may be configured to transmit the ULCI 310 sometime before the scheduled PUSCH 320. In some cases, the UE 115 may be configured with periodic PUCCH resources for transmitting ULCI 310. Additionally, or alternatively, the ULCI 310 may be multiplexed with a UCI message (e.g., control state information (CSI) report or hybrid automatic repeat request (HARQ)).

In some cases, the UE 115 may be configured with a timing condition such that the ULCI 310 is transmitted a time interval 330 before the scheduled PUSCH 320. In some cases, the UE 115 may be preconfigured or receive an indication of the time interval 330, such as via RRC signaling, MAC-CE signaling, DCI signaling, etc. Time interval 330 may measure the time between the last symbol of the ULCI 310 and the first symbol of the scheduled PUSCH 320 and be configured based on the decoding and processing time required by the network entity 105 to process the ULCI 310. The network entity 105 may configure time interval 330 to be within a minimum time T0 and a maximum time T1, such that time interval 330 has a lower threshold of T0 and an upper limit of T1. For example, the network entity 105 may configure T0 such that the network entity 105 has time to reallocate the canceled resources 315, and T1 may be a pre-defined maximum time gap between the ULCI 310 and PUSCH 320 provided so that the network entity 105 only detects ULCI occasions corresponding to the PUSCH 320. The time interval 330 may be configured through control signaling (e.g., RRC or DCI) and be conditional on the capabilities of network entity 105 and the subcarrier spacing of the uplink bandwidth part. For example, a network entity 105 may configure a UE 115 with the time interval 330 (e.g., T0, T1, the difference between T0 and T1, a duration, such as a maximum duration and/or minimum duration, between the last symbol of the ULCI and the first symbol of the scheduled PUSCH, or a combination thereof), and may schedule the UE 115 to transmit a message using PUSCH resources 320. The network entity 105 may then monitor during the time interval 330 for a ULCI to determine if the UE 115 canceled the scheduled uplink transmission (e.g., one or more of the PUSCH resource). If ULCI is detected by the network entity 105, the network entity 105 may skip decoding the PUSCH and/or recycle the PUSCH resources for other transmissions.

In some implementations, the UE 115 may be configured to transmit a ULPI 325 that cancels resources of a previously transmitted PUSCH 320. For example, the UE 115 may determine to cancel a portion of the resources of PUSCH 320, and may use the portion of the resources for another task. Accordingly, the UE 115 may then use the portion of the resources for the other task and in some cases, transmit the remaining portion of the scheduled PUSCH. The UE 115 may then transmit a ULPI 325 indicative of the portion of canceled resources 315 after the PUSCH 320 has been received by the network entity 105. In some cases, the UE 115 may be configured to transmit the ULPI 325 within a time interval 335, where time interval 335 may define the time between the last symbol of the PUSCH 320 and the first symbol of the ULPI 325. In some cases, the UE 115 may be preconfigured or receive an indication of the time interval 335, such as via RRC signaling, MAC-CE signaling, DCI signaling, etc. The time interval 335 may be configured within a timing condition T2 that defines the time frame during which the network entity 105 may monitor for the ULPI 325.

For example, a network entity 105 may configure a UE 115 with the time interval 335 (e.g., T2, a duration, such as a maximum duration, between the last symbol of the scheduled PUSCH and the first symbol of the ULPI, or a combination thereof) and may schedule the UE 115 to transmit a message using PUSCH resources 320. The network entity 105 may monitor for and receive a PUSCH from the UE 115 but may then monitor during the time interval 335 for a ULPI 325. In some cases, the network entity 105 may refrain from decoding the received PUSCH until the network entity 105 receives a ULPI and/or until the time interval 335 is over. The ULPI 325 may indicate to the network entity 105 whether UE 115 modified any scheduled uplink resources and/or transmission parameters of the original scheduled PUSCH. If ULPI 325 is detected by the network entity 105, the network entity 105 may adapt the decoding of the received PUSCH according to the ULPI 325.

In some cases, the UE 115 may be configured to transmit a cancellation indication as a ULCI 310 (e.g., a cancellation indication transmitted prior to the scheduled PUSCH) or a ULPI 325 (e.g., a cancellation indication transmitted prior to the scheduled PUSCH). For example, the network entity 105 may configure, such as via control message (e.g., an RRC, DCI, MAC-CE), the UE 115 to only transmit a ULPI, or only transmit a ULCI. In other cases, the UE 115 may be configured to transmit a cancellation indication before or after the scheduled PUSCH 320, or both. If the UE 115 is able to transmit a cancellation indication before or after the scheduled PUSCH 320, the UE 115 may prioritize earlier ULCI transmission opportunities. For example, the UE 115 may determine whether there are resources available to the UE to transmit the ULCI prior to the scheduled PUSCH. If so, the UE 115 may transmit the ULCI. However, if there are no resources available prior to the scheduled PSUCH, for example, the UE 115 may transmit the ULPI after the scheduled PUSCH resources. Additionally, or alternatively, the network entity 105 may configure (e.g., via RRC, MAC-CE, DCI) the UE 115 with a set of one or more periodic resources (e.g., PUCCH resources) for the UE 115 to use to transmit the ULPI and/or ULCI. Accordingly, the UE 115 may transmit the ULPI and/or ULCI use the configured periodic resources.

Figure 4:
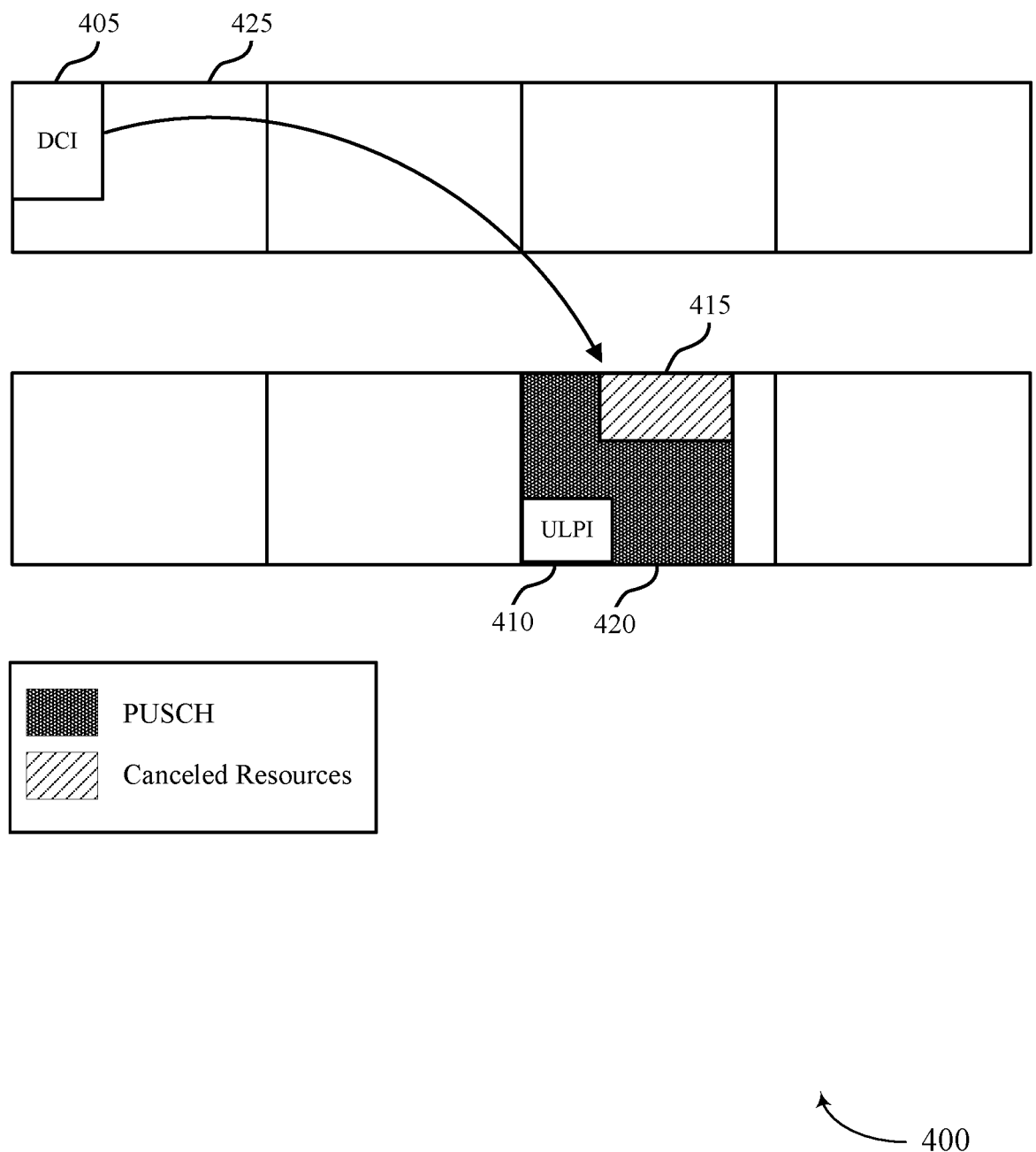
FIG. 4 illustrates an example of a communication timeline that supports techniques for transmitting a cancellation indication in accordance with one or more aspects of the present disclosure.

FIG. 4 illustrates an example of a communication timeline 400 that supports techniques for transmitting a cancellation indication in accordance with one or more aspects of the present disclosure. The timeline 400 may implement or be implemented by aspects of the wireless communications system 100 and 200. For example, the timeline 400 may include transmission of downlink control information 305 by a device which may be an example of network entity 105 described with reference to FIGS. 1 and 2. The ULPI 410 may be an example of cancellation indication 220, and the device that transmits the cancellation indication and PUSCH 320 may be an example of UE 115 described with reference to FIGS. 1 and 2.

Similarly as described with reference to FIG. 3, a network entity 105 may transmit a DCI message 405 that schedules PUSCH resources 420 in a resource 425 (e.g., a time resource, frequency resource, or both). In some implementations, the UE 115 may be configured and/or determine to transmit a cancellation indication to indicate that a portion of resources 415 within PUSCH 420 are canceled. In some implementations, a UE 115 may be configured to transmit a cancellation indication (e.g., a ULCI, ULPI) as or a part of the UCI included in the PUSCH 420. For example, if the UE 115 is configured with a set of PUCCH resources for transmitting a ULPI 410 that overlap with the scheduled PUSCH 420, the UE 115 may multiplex the ULPI 410 with the scheduled PUSCH 420. In some cases, the resources used for transmitting the ULPI 410 may not be included in the canceled resources 415 (e.g., the UE 115 may not cancel the resources configured for the ULPI 410). In some cases, the UE 115 may use a configured modulation and coding format for transmitting the ULPI 410.

The network entity 105 may monitor for a cancellation indication such as the ULPI 410. When the network entity 105 receives the PUSCH 420, the network entity 105 may decode the ULPI 410 and identity the inclusion of a ULPI 410. In such cases, the network entity 105 may re-decode and/or re-process the received PUSCH to ignore the canceled resources indicated by the ULPI 410.

In some cases, the UE 115 may be configured to transmit the cancellation indication with the scheduled PUSCH 420 via an RRC message, MAC-CE message, and/or DCI message 405 from the network entity 105. Additionally, or alternatively, the network entity 105 may configure (e.g., via RRC, MAC-CE, DCI) the UE 115 with a set of one or more periodic resources (e.g., PUCCH resources) for the UE 115 to use to transmit the cancellation indication. In some cases, the UE 115 may implicitly determine to multiplex the cancellation indication with the scheduled PUSCH 420 based on the configured PUCCH resources overlapping with the scheduled PUSCH.

Figure 5:
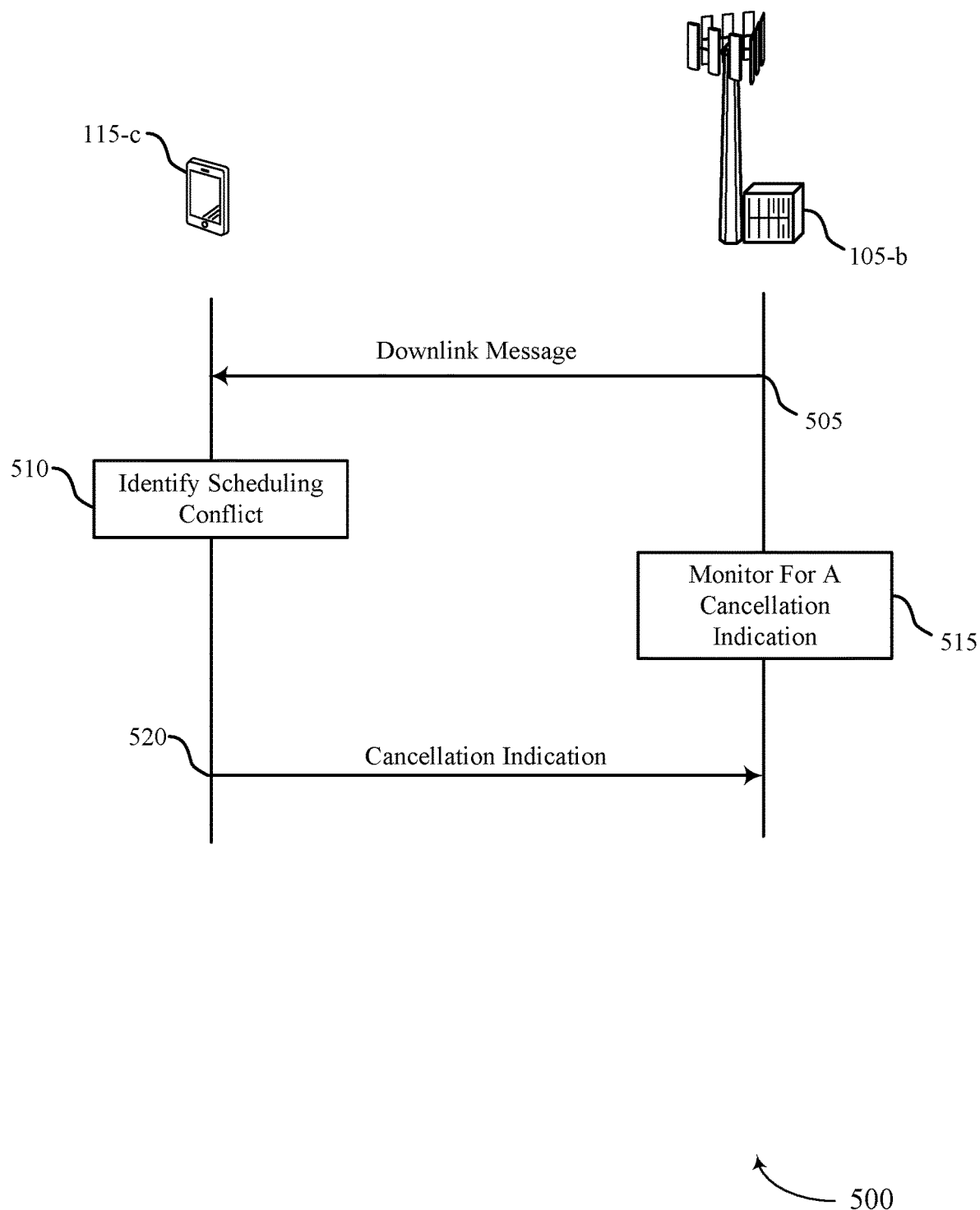
FIG. 5 illustrates an example of a process flow that supports techniques for transmitting a cancellation indication in accordance with one or more aspects of the present disclosure.

FIG. 5 illustrates an example of a process flow 500 that supports techniques for transmitting a cancellation indication in accordance with one or more aspects of the present disclosure. In some examples, the process flow 500 may implement or be implemented by aspects of the wireless communications systems 100 and 200 as described with reference to FIGS. 1 and 2, respectively. For example, the process flow 500 may be implemented by a network entity 105-b and UE 115-c, which may be an example of a network entity 105 and a UE 115 as described with reference to FIGS. 1 through 4, respectively. The process flow 500 may be implemented by the network entity 105-b and UE 115-c to exchange signaling to promote low latency at the UE 115-c and reliable communications between the network entity 105-b and the UE 115-b. In the following description of the process flow 500, the operations between the network entity 105-b and the UE 115-c may be transmitted in a different order than the example order shown, or the operations performed by the network entity 105-b and the UE 115-c may be performed in different orders or at different times. Some operations may also be omitted from the process flow 500, and other operations may be added to the process flow 500.

At 505, the network entity 105-b may transmit a downlink message to the UE 115-c. The downlink message may contain scheduling information indicating a set of resources on which an uplink message is scheduled to be transmitted by the UE. For example, the scheduling information may indicate a set of resources for uplink and sidelink transmissions. The downlink message may also contain information for configuring the UE 115-c to transmit cancellation indications. For example, the downlink message may include a threshold value such that if a scheduled uplink transmission is above the threshold, the UE 115-c may not transmit a cancellation indication. The downlink message may also indicate a timing window during which a cancellation indication may be transmitted.

At 510, the UE 115-c may identify a scheduling conflict with at least a portion of the set of resources, where the scheduling conflict may arise between the uplink message and a second communication at the UE. For example, the UE 115-c may identify a conflict between the scheduled uplink transmission and another task at the UE 115-c. For example, the scheduled uplink transmission may conflict with a task such as positioning, measuring, sensing, performing sidelink communications, Wi-Fi communications, Bluetooth communications, or a combination thereof. In some cases, the conflicting task may be of a high priority (e.g., higher priority than the uplink message).

At 515, the network entity 105-b may monitor for a cancellation indication indicating that transmission of the uplink message on at least a portion of the set of resources is preempted based on a scheduling conflict at the UE 115.

At 520, the UE 115-c may transmit a cancellation indication to the network entity 105-b to indicate that transmission of the uplink message on at least the portion of the set of resources is preempted based on the scheduling conflict. In some cases, the cancellation indication may be a ULCI (e.g., transmitted prior to the uplink message) and in other cases the cancellation indication may be a ULPI (e.g., transmitted after the uplink message). For example, the UE 115-c may transmit the cancellation indication before the scheduled uplink transmission, with the scheduled uplink transmission, or after the scheduled uplink transmission.

Transmitting the cancellation indication (e.g., the ULCI) may include transmitting the cancellation indication based on a duration between a last symbol of the cancellation indication and a first symbol of the uplink message satisfying a range, where the range may have a lower threshold and an upper threshold. The lower threshold may be based on a decoding and processing capability of the network entity 105-b. The upper threshold may be a maximum duration between the cancellation indication and the uplink message. In some cases, transmitting the cancellation indication may include transmitting the cancellation indication prior to the uplink message based on the UE 115 being configured to prioritize transmitting the cancellation indication prior to the uplink message rather than after. In some cases, transmitting the cancellation indication (e.g., ULPI) may include transmitting the cancellation indication based on a duration between a last symbol of the uplink message and a first symbol of the cancellation indication satisfying a threshold. The threshold is based on a defined duration for a network entity to monitor for the cancellation indication.

In some cases, transmitting the cancellation indication may include transmitting the cancellation indication as UCI included in the uplink message. In some cases, transmitting the cancellation indication may include transmitting an indication of a reason for canceling transmission of at least the portion of the set of resources of the uplink message, where the reason is the second communication. Transmitting the cancellation indication may include transmitting an indication of the set of resources on which transmission of the uplink message is canceled, where the indication may include one or more time resources, one or more frequency resources, or a combination thereof. Transmitting the cancellation indication may include transmitting an indication of a period that the UE 115 will refrain from transmitting the uplink message on the at least the portion of the set of resources. Transmitting the cancellation indication may include transmitting the cancellation indication on a set of uplink control channel resources dedicated to the cancellation indication of an uplink control channel.

Transmitting the cancellation indication may include transmitting the cancellation indication by multiplexing the cancellation indication with UCI an uplink control channel, where the UCI may include channel state information, feedback information, or both. In some cases, transmitting the cancellation indication may include transmitting an indication of an updated set of one or more transmission parameters updated by the UE 115. The updated set of one or more transmission parameters may include a packet size, a modulation and coding scheme, or both, where the updated set of one or more transmission parameters may be updated from a respective one or more transmission parameters included in a downlink control information message. The cancellation indication may include 14 bits.

In some cases, UE 115-c may receive an indication of a configuration for transmitting the cancellation indication, where transmitting the cancellation indication is based on the configuration. The configuration may indicate the cancellation indication is to be transmitted prior to the uplink message, after the uplink message, or either. The configuration may indicate one or more timing parameters associated with transmitting the cancellation indication with respect to the uplink message. In some cases, UE 115-c may receive a signal indicating a set of uplink control channel resources for transmitting the cancellation indication, where the set of uplink control channel resources may be periodic resources. In some implementations, the UE 115 may receive an indication of a threshold priority to use in determining whether to preempt uplink transmissions, where transmitting the cancellation indication may be based on the uplink message have a priority less than the threshold priority.

In some cases, UE 115-c may transmitting the uplink message on a remaining portion of resources scheduled for the uplink message, where the remaining portion of resources may not be preempted by the UE 115. In some cases, UE 115-c may communicate in accordance with the second communication on at least the portion of the set of resources.

Upon receiving a cancellation indication, the network entity 105-b may update the decoding procedure according to the received cancellation indication. For example, the network entity 105 may update a decoding procedure of the network entity 105 for decoding the uplink message based on the indication of the updated set of one or more transmission parameters. In some cases, the network entity 105 may determine to refrain from decoding the set of resources of the uplink message based on the cancellation indication. In some cases, the network entity 105 may reallocate (e.g., re-assign) the canceled resources to another device. If the received data (e.g., PUSCH) has not been decoded, the network entity 105-b may decode the data without the canceled portion. If the received data has been decoded, the network entity 105-b may decode the data again but with the canceled portion omitted.

Figure 6:
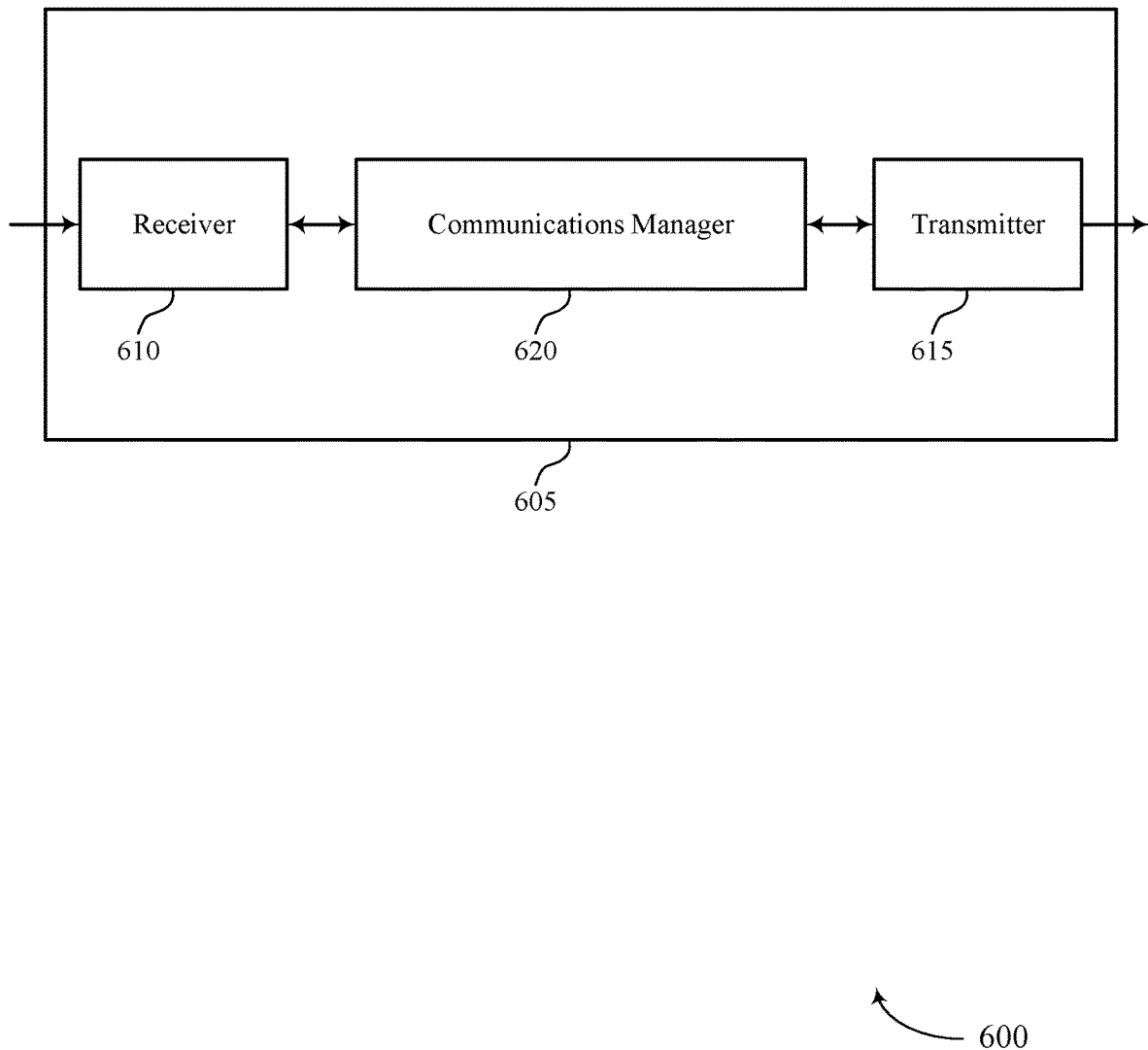
FIGS. 6 and 7 show block diagrams of devices that support techniques for transmitting a cancellation indication in accordance with one or more aspects of the present disclosure.

FIG. 6 shows a block diagram 600 of a device 605 that supports techniques for transmitting a cancellation indication in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for transmitting a cancellation indication). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for transmitting a cancellation indication). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques for transmitting a cancellation indication as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE in accordance with examples as disclosed herein. For example, the communications manager 620 may be configured as or otherwise support a means for receiving a downlink message indicating a set of resources on which an uplink message is scheduled to be transmitted by the UE. The communications manager 620 may be configured as or otherwise support a means for identifying a scheduling conflict with at least a portion of the set of resources, the scheduling conflict arising between the uplink message and a second communication at the UE. The communications manager 620 may be configured as or otherwise support a means for transmitting, by the UE, a cancellation indication associated with at least the portion of the set of resources based on the scheduling conflict.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for more efficient utilization of communication resources.

Figure 7:
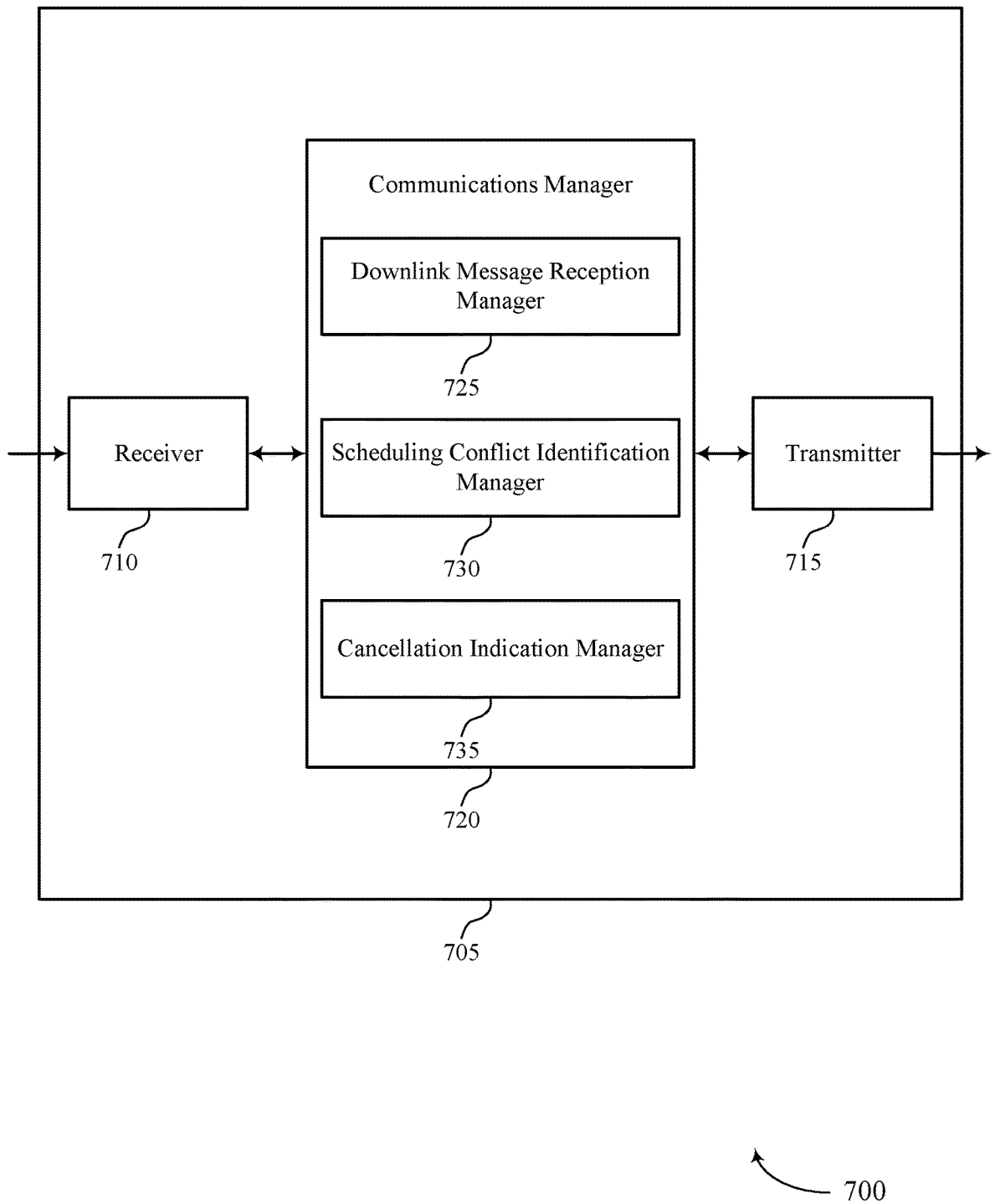

FIG. 7 shows a block diagram 700 of a device 705 that supports techniques for transmitting a cancellation indication in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for transmitting a cancellation indication). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for transmitting a cancellation indication). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for transmitting a cancellation indication as described herein. For example, the communications manager 720 may include a downlink message reception manager 725, a scheduling conflict identification manager 730, a cancellation indication manager 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a UE in accordance with examples as disclosed herein. The downlink message reception manager 725 may be configured as or otherwise support a means for receiving a downlink message indicating a set of resources on which an uplink message is scheduled to be transmitted by the UE. The scheduling conflict identification manager 730 may be configured as or otherwise support a means for identifying a scheduling conflict with at least a portion of the set of resources, the scheduling conflict arising between the uplink message and a second communication at the UE. The cancellation indication manager 735 may be configured as or otherwise support a means for transmitting, by the UE, a cancellation indication associated with at least the portion of the set of resources based on the scheduling conflict.

Figure 8:
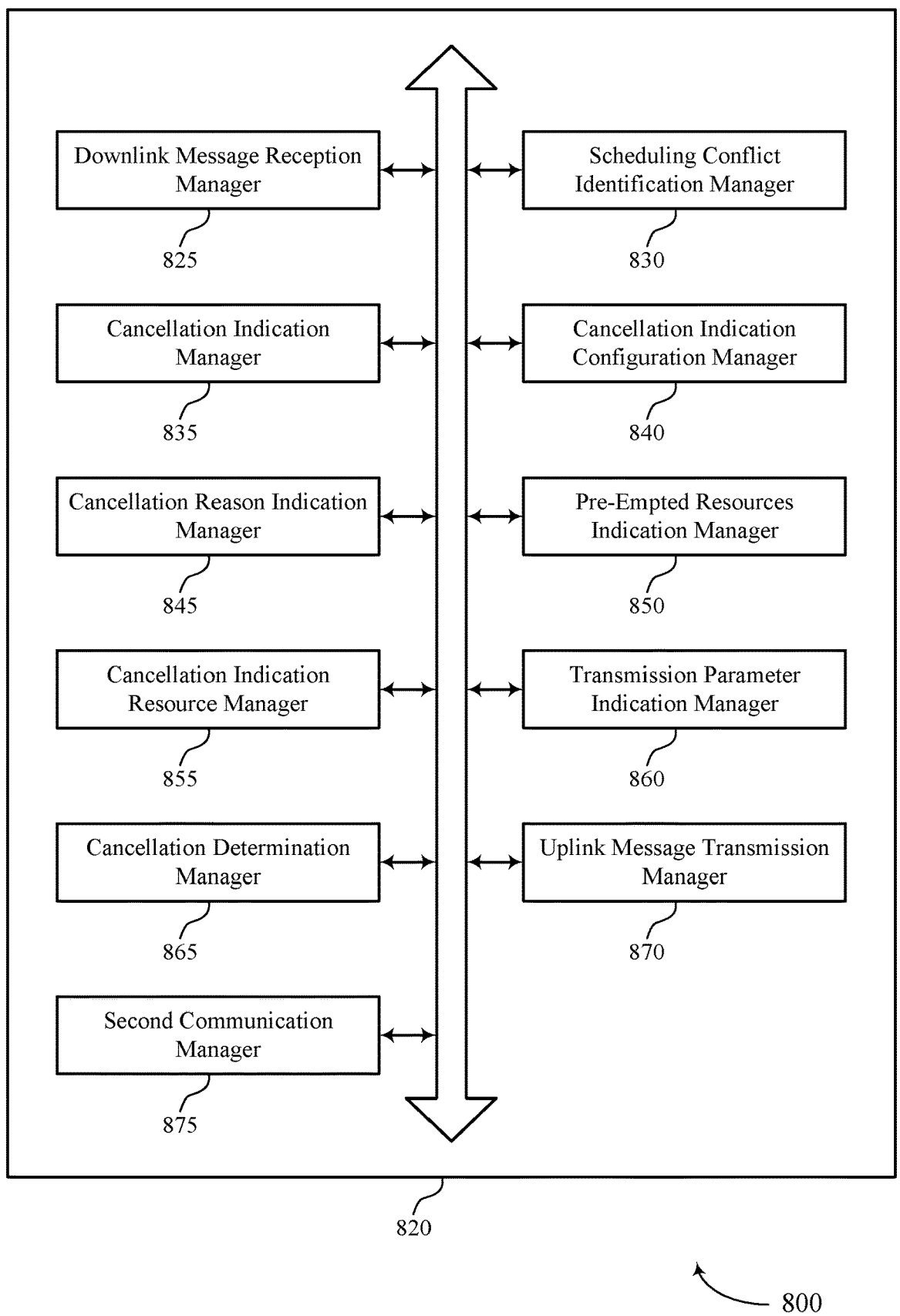
FIG. 8 shows a block diagram of a communications manager that supports techniques for transmitting a cancellation indication in accordance with one or more aspects of the present disclosure.

FIG. 8 shows a block diagram 800 of a communications manager 820 that supports techniques for transmitting a cancellation indication in accordance with one or more aspects of the present disclosure. The communications manager 820 may be an example of aspects of a communications manager 620, a communications manager 720, or both, as described herein. The communications manager 820, or various components thereof, may be an example of means for performing various aspects of techniques for transmitting a cancellation indication as described herein. For example, the communications manager 820 may include a downlink message reception manager 825, a scheduling conflict identification manager 830, a cancellation indication manager 835, a cancellation indication configuration manager 840, a cancellation reason indication manager 845, a pre-empted resources indication manager 850, a cancellation indication resource manager 855, a transmission parameter indication manager 860, a cancellation determination manager 865, an uplink message transmission manager 870, a second communication manager 875, or any combination thereof. Each of these components may communicate, directly or indirectly, with one another (e.g., via one or more buses).

The communications manager 820 may support wireless communications at a UE in accordance with examples as disclosed herein. The downlink message reception manager 825 may be configured as or otherwise support a means for receiving a downlink message indicating a set of resources on which an uplink message is scheduled to be transmitted by the UE. The scheduling conflict identification manager 830 may be configured as or otherwise support a means for identifying a scheduling conflict with at least a portion of the set of resources, the scheduling conflict arising between the uplink message and a second communication at the UE. The cancellation indication manager 835 may be configured as or otherwise support a means for transmitting, by the UE, a cancellation indication associated with at least the portion of the set of resources based on the scheduling conflict.

In some examples, to support transmitting the cancellation indication, the cancellation indication manager 835 may be configured as or otherwise support a means for transmitting the cancellation indication prior to the uplink message, the cancellation indication being a ULCI.

In some examples, to support transmitting the cancellation indication, the cancellation indication manager 835 may be configured as or otherwise support a means for transmitting the cancellation indication based on a duration between a last symbol of the cancellation indication and a first symbol of the uplink message satisfying a range, the range having a lower threshold and an upper threshold.

In some examples, the lower threshold is based on a decoding and processing capability of a network entity.

In some examples, the upper threshold is a maximum duration between the cancellation indication and the uplink message.

In some examples, to support transmitting the cancellation indication, the cancellation indication manager 835 may be configured as or otherwise support a means for transmitting the cancellation indication prior to the uplink message based on the UE being configured to prioritize transmitting the cancellation indication prior to the uplink message rather than after.

In some examples, to support transmitting the cancellation indication, the cancellation indication manager 835 may be configured as or otherwise support a means for transmitting the cancellation indication after the uplink message, the cancellation indication being a ULPI.

In some examples, to support transmitting the cancellation indication, the cancellation indication manager 835 may be configured as or otherwise support a means for transmitting the cancellation indication based on a duration between a last symbol of the uplink message and a first symbol of the cancellation indication satisfying a threshold.

In some examples, the threshold is based on a defined duration for a network entity to monitor for the cancellation indication.

In some examples, the cancellation indication configuration manager 840 may be configured as or otherwise support a means for receiving an indication of a configuration for transmitting the cancellation indication, where transmitting the cancellation indication is based on the configuration.

In some examples, the configuration indicates the cancellation indication is to be transmitted prior to the uplink message, after the uplink message, or either.

In some examples, the configuration indicates one or more timing parameters associated with transmitting the cancellation indication with respect to the uplink message.

In some examples, to support transmitting the cancellation indication, the cancellation indication manager 835 may be configured as or otherwise support a means for transmitting the cancellation indication as uplink control information included in the uplink message.

In some examples, to support transmitting the cancellation indication, the cancellation reason indication manager 845 may be configured as or otherwise support a means for transmitting an indication of a reason for canceling transmission of at least the portion of the set of resources of the uplink message, the reason being the second communication.

In some examples, to support transmitting the cancellation indication, the pre-empted resources indication manager 850 may be configured as or otherwise support a means for transmitting an indication of the set of resources on which transmission of the uplink message is canceled, the indication including one or more time resources, one or more frequency resources, or a combination thereof.

In some examples, to support transmitting the cancellation indication, the pre-empted resources indication manager 850 may be configured as or otherwise support a means for transmitting an indication of a period that the UE will refrain from transmitting the uplink message on the at least the portion of the set of resources.

In some examples, to support transmitting the cancellation indication, the cancellation indication resource manager 855 may be configured as or otherwise support a means for transmitting the cancellation indication on a set of uplink control channel resources dedicated to the cancellation indication of an uplink control channel.

In some examples, the cancellation indication resource manager 855 may be configured as or otherwise support a means for receiving a signal indicating a set of uplink control channel resources for transmitting the cancellation indication, the set of uplink control channel resources being periodic resources.

In some examples, to support transmitting the cancellation indication, the cancellation indication manager 835 may be configured as or otherwise support a means for transmitting the cancellation indication by multiplexing the cancellation indication with uplink control information an uplink control channel, the uplink control information including channel state information, feedback information, or both.

In some examples, to support transmitting the cancellation indication, the transmission parameter indication manager 860 may be configured as or otherwise support a means for transmitting an indication of an updated set of one or more transmission parameters updated by the UE, the updated set of one or more transmission parameters including a packet size, a modulation and coding scheme, or both, where the updated set of one or more transmission parameters are updated from a respective one or more transmission parameters included in a downlink control information message.

In some examples, the cancellation determination manager 865 may be configured as or otherwise support a means for receiving an indication of a threshold priority to use in determining whether to refrain from uplink transmissions, where transmitting the cancellation indication is based on the uplink message have a priority less than the threshold priority.

In some examples, the uplink message transmission manager 870 may be configured as or otherwise support a means for transmitting the uplink message on a remaining portion of resources scheduled for the uplink message, the remaining portion of resources not preempted by the UE.

In some examples, the second communication manager 875 may be configured as or otherwise support a means for communicating in accordance with the second communication on at least the portion of the set of resources.

In some examples, the cancellation indication includes 14 bits.

In some examples, the second communication is associated with a higher priority than the uplink message.

In some examples, the second communication is associated with positioning, measurements, sensing, sidelink communications, Wi-Fi communications, Bluetooth communications, or a combination thereof.

Figure 9:
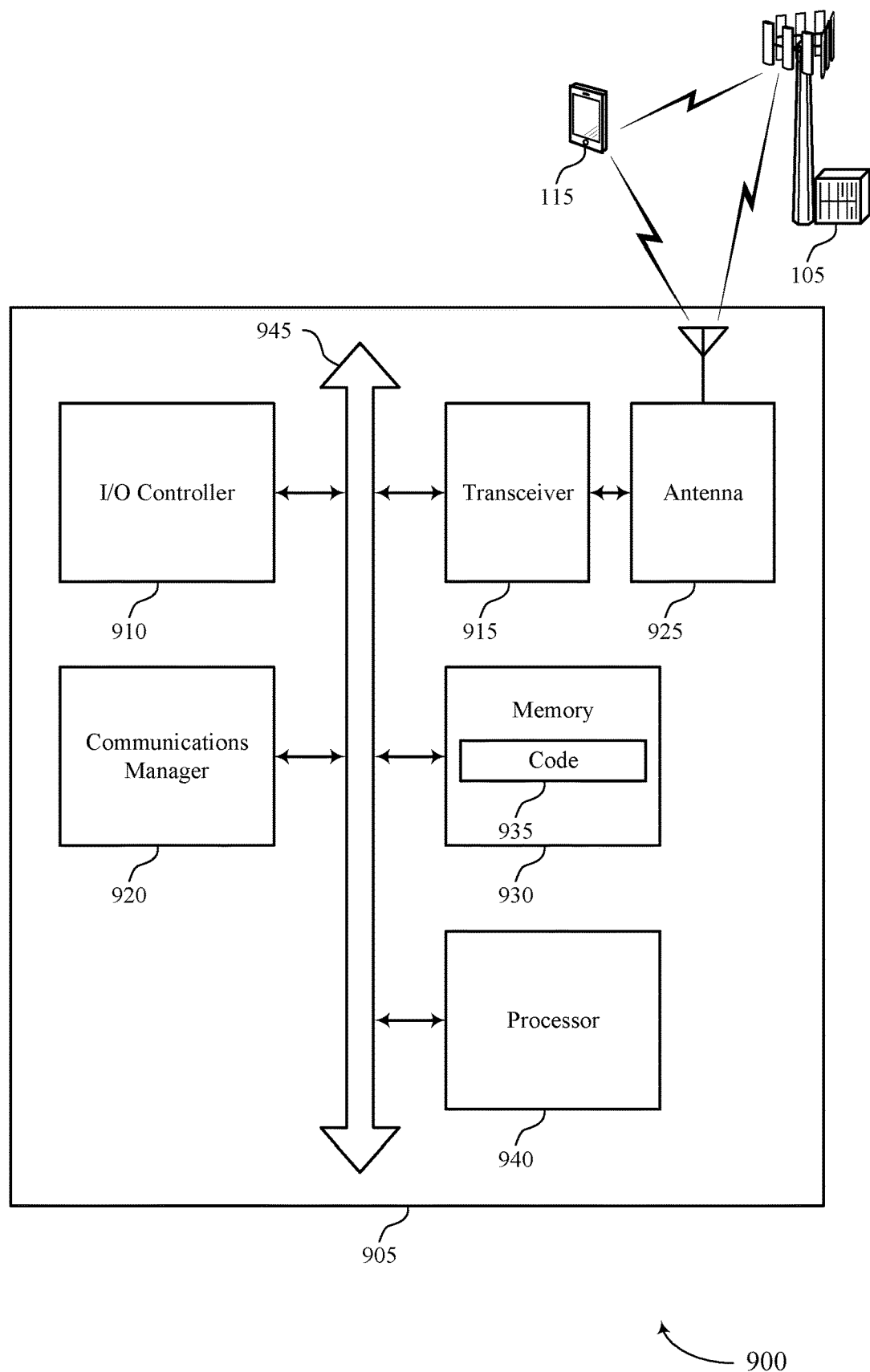
FIG. 9 shows a diagram of a system including a device that supports techniques for transmitting a cancellation indication in accordance with one or more aspects of the present disclosure.

FIG. 9 shows a diagram of a system 900 including a device 905 that supports techniques for transmitting a cancellation indication in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for transmitting a cancellation indication). For example, the device 905 or a component of the device 905 may include a processor 940 and memory 930 coupled with or to the processor 940, the processor 940 and memory 930 configured to perform various functions described herein.

The communications manager 920 may support wireless communications at a UE in accordance with examples as disclosed herein. For example, the communications manager 920 may be configured as or otherwise support a means for receiving a downlink message indicating a set of resources on which an uplink message is scheduled to be transmitted by the UE. The communications manager 920 may be configured as or otherwise support a means for identifying a scheduling conflict with at least a portion of the set of resources, the scheduling conflict arising between the uplink message and a second communication at the UE. The communications manager 920 may be configured as or otherwise support a means for transmitting, by the UE, a cancellation indication associated with at least the portion of the set of resources based on the scheduling conflict.

By including or configuring the communications manager 920 in accordance with examples as described herein, the device 905 may support techniques for improved communication reliability, reduced latency, more efficient utilization of communication resources, and improved coordination between devices.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for transmitting a cancellation indication as described herein, or the processor 940 and the memory 930 may be otherwise configured to perform or support such operations.

Figure 10:
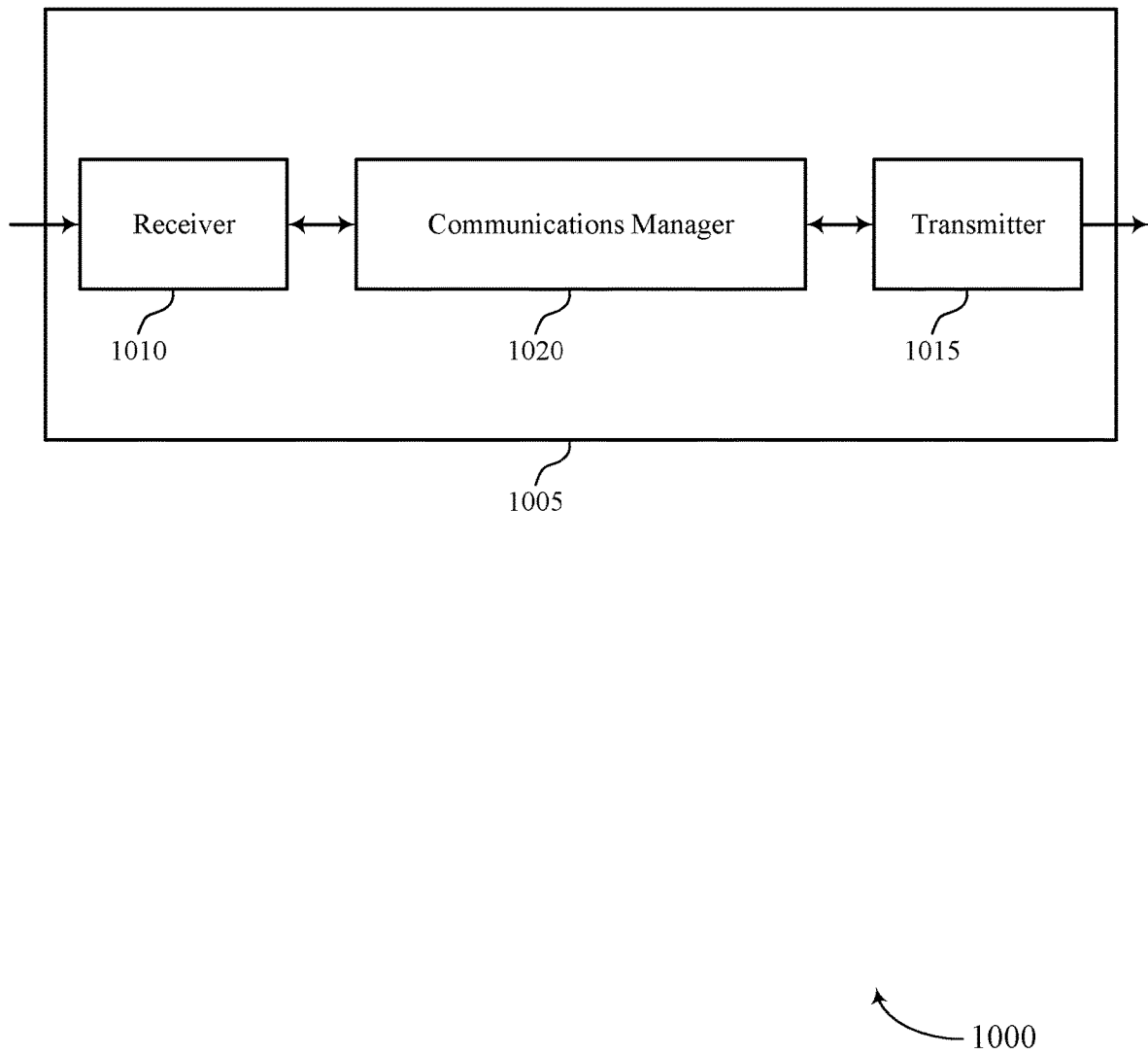
FIGS. 10 and 11 show block diagrams of devices that support techniques for transmitting a cancellation indication in accordance with one or more aspects of the present disclosure.

FIG. 10 shows a block diagram 1000 of a device 1005 that supports techniques for transmitting a cancellation indication in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of techniques for transmitting a cancellation indication as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a network entity in accordance with examples as disclosed herein. For example, the communications manager 1020 may be configured as or otherwise support a means for transmitting a downlink message indicating a set of resources on which an uplink message is scheduled to be transmitted by a UE. The communications manager 1020 may be configured as or otherwise support a means for monitoring for a cancellation indication indicating that transmission of the uplink message on at least a portion of the set of resources is preempted based on a scheduling conflict at the UE. The communications manager 1020 may be configured as or otherwise support a means for receiving the cancellation indication based on monitoring for the cancellation indication.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for more efficient utilization of communication resources.

Figure 11:
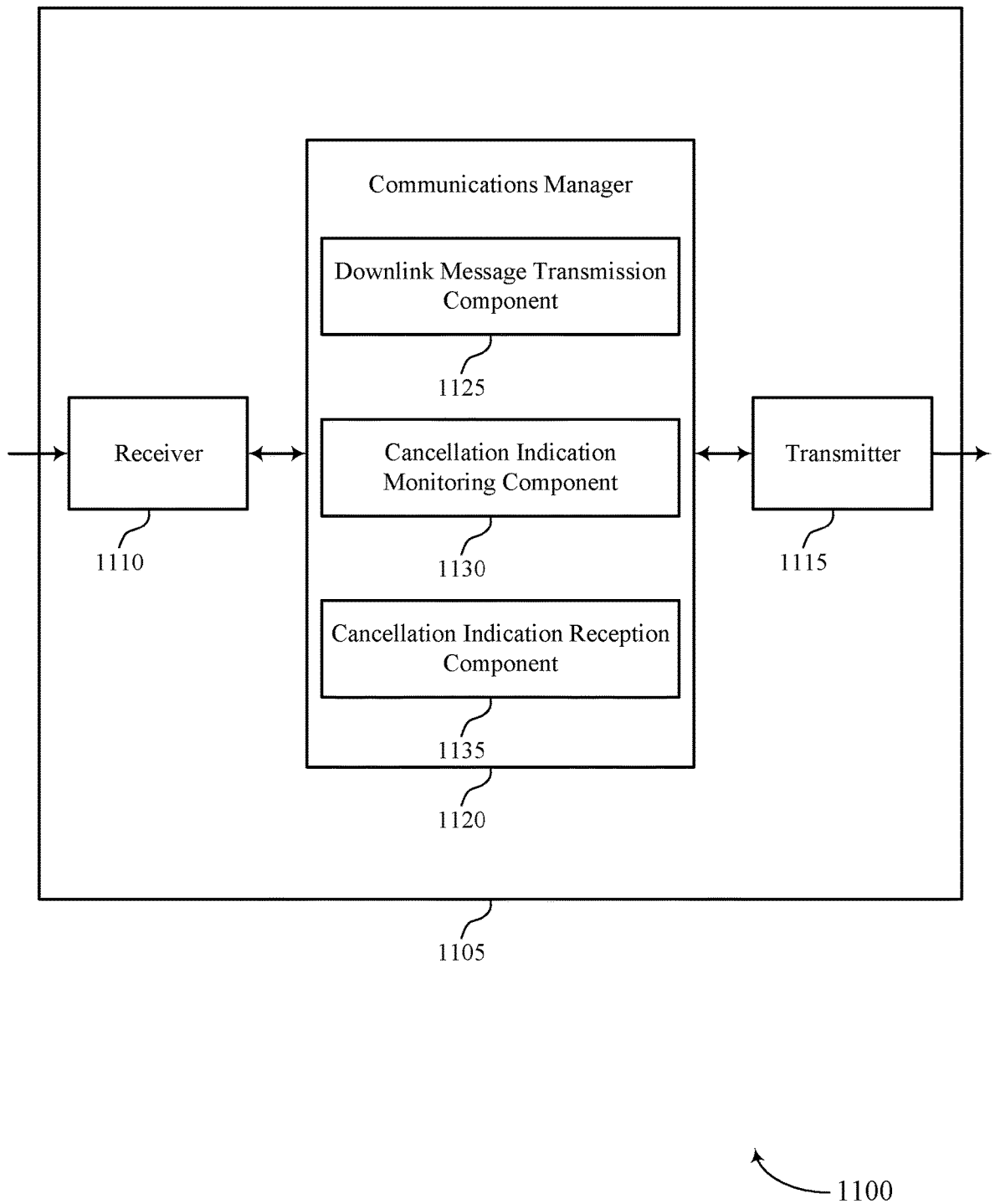

FIG. 11 shows a block diagram 1100 of a device 1105 that supports techniques for transmitting a cancellation indication in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of techniques for transmitting a cancellation indication as described herein. For example, the communications manager 1120 may include a downlink message transmission component 1125, a cancellation indication monitoring component 1130, a cancellation indication reception component 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a network entity in accordance with examples as disclosed herein. The downlink message transmission component 1125 may be configured as or otherwise support a means for transmitting a downlink message indicating a set of resources on which an uplink message is scheduled to be transmitted by a UE. The cancellation indication monitoring component 1130 may be configured as or otherwise support a means for monitoring for a cancellation indication indicating that transmission of the uplink message on at least a portion of the set of resources is preempted based on a scheduling conflict at the UE. The cancellation indication reception component 1135 may be configured as or otherwise support a means for receiving the cancellation indication based on monitoring for the cancellation indication.

Figure 12:
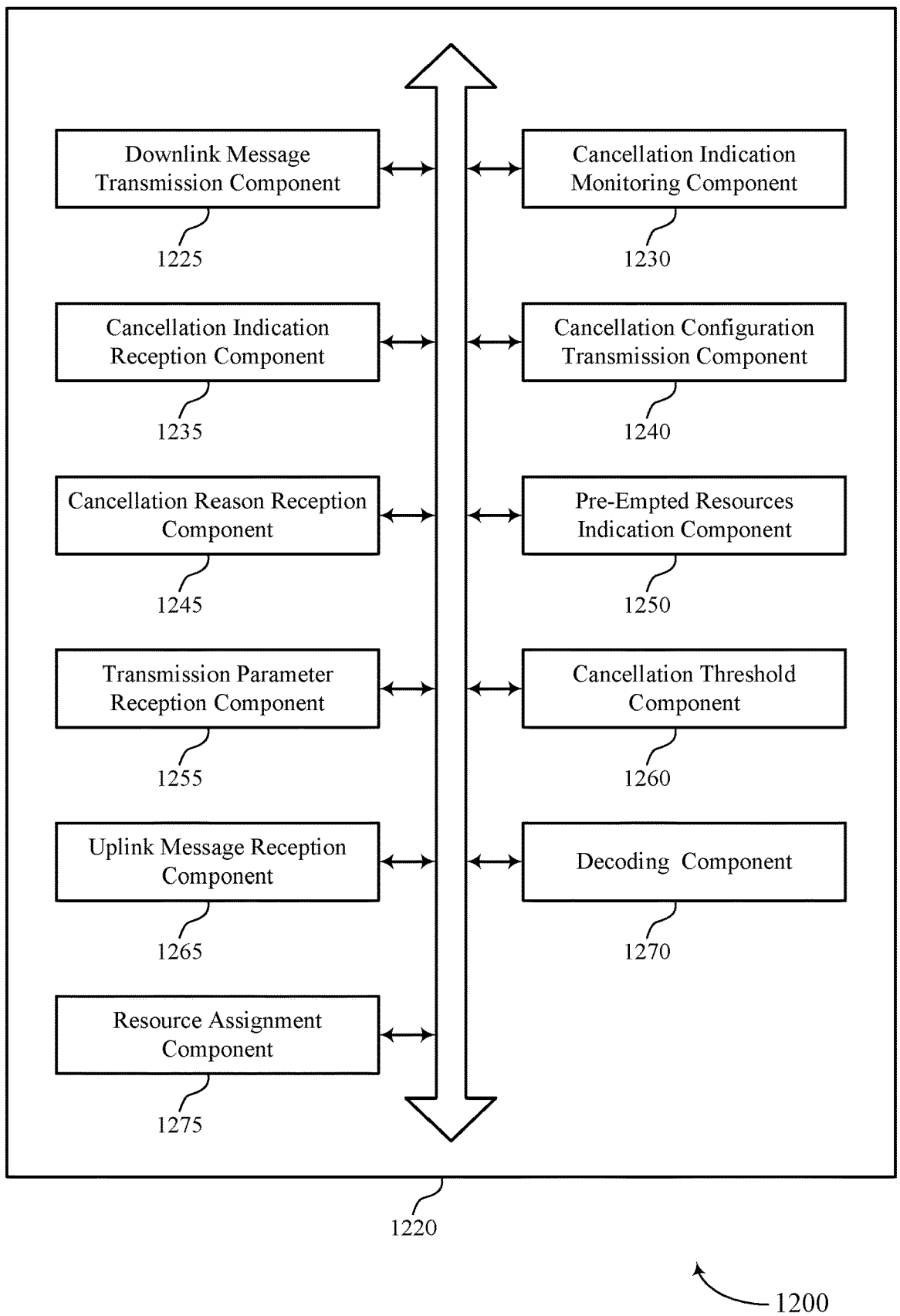
FIG. 12 shows a block diagram of a communications manager that supports techniques for transmitting a cancellation indication in accordance with one or more aspects of the present disclosure.

FIG. 12 shows a block diagram 1200 of a communications manager 1220 that supports techniques for transmitting a cancellation indication in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of techniques for transmitting a cancellation indication as described herein. For example, the communications manager 1220 may include a downlink message transmission component 1225, a cancellation indication monitoring component 1230, a cancellation indication reception component 1235, a cancellation configuration transmission component 1240, a cancellation reason reception component 1245, a pre-empted resources indication component 1250, a transmission parameter reception component 1255, a cancellation threshold component 1260, an uplink message reception component 1265, a decoding component 1270, a resource assignment component 1275, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communications at a network entity in accordance with examples as disclosed herein. The downlink message transmission component 1225 may be configured as or otherwise support a means for transmitting a downlink message indicating a set of resources on which an uplink message is scheduled to be transmitted by a UE. The cancellation indication monitoring component 1230 may be configured as or otherwise support a means for monitoring for a cancellation indication indicating that transmission of the uplink message on at least a portion of the set of resources is preempted based on a scheduling conflict at the UE. The cancellation indication reception component 1235 may be configured as or otherwise support a means for receiving the cancellation indication based on monitoring for the cancellation indication.

In some examples, to support receiving the cancellation indication, the cancellation indication reception component 1235 may be configured as or otherwise support a means for receiving the cancellation indication prior to the uplink message, the cancellation indication being a ULCI.

In some examples, to support receiving the cancellation indication, the cancellation indication reception component 1235 may be configured as or otherwise support a means for receiving the cancellation indication in a range between a last symbol of the cancellation indication and a first symbol of the uplink message, the range having a lower threshold and an upper threshold.

In some examples, the lower threshold is based on a decoding and processing capability of the network entity.

In some examples, the upper threshold is a maximum duration between the cancellation indication and the uplink message.

In some examples, to support receiving the cancellation indication, the cancellation indication reception component 1235 may be configured as or otherwise support a means for receiving the cancellation indication after the uplink message, the cancellation indication being a ULPI.

In some examples, to support receiving the cancellation indication, the cancellation indication reception component 1235 may be configured as or otherwise support a means for receiving the cancellation indication in accordance with a threshold duration between a last symbol of the uplink message and a first symbol of the cancellation indication.

In some examples, the threshold duration is based on a defined duration for the network entity to monitor for the cancellation indication.

In some examples, the cancellation configuration transmission component 1240 may be configured as or otherwise support a means for transmitting an indication of a configuration for transmitting the cancellation indication but the UE, where monitoring for the cancellation indication is based on the configuration.

In some examples, the configuration indicates the cancellation indication is to be transmitted prior to the uplink message, after the uplink message, or either.

In some examples, the configuration indicates one or more timing parameters associated with transmitting the cancellation indication with respect to the uplink message.

In some examples, to support receiving the cancellation indication, the cancellation indication reception component 1235 may be configured as or otherwise support a means for receiving the cancellation indication as uplink control information included in the uplink message.

In some examples, to support receiving the cancellation indication, the cancellation reason reception component 1245 may be configured as or otherwise support a means for receiving an indication of a reason for canceling transmission of at least the portion of the set of resources of the uplink message.

In some examples, to support receiving the cancellation indication, the pre-empted resources indication component 1250 may be configured as or otherwise support a means for receiving an indication of the set of resources on which transmission of the uplink message is canceled, the indication including one or more time resources, one or more frequency resources, or a combination thereof.

In some examples, to support receiving the cancellation indication, the pre-empted resources indication component 1250 may be configured as or otherwise support a means for receiving an indication of a period that the UE will refrain from transmitting the uplink message on the at least the portion of the set of resources.

In some examples, to support receiving the cancellation indication, the cancellation indication reception component 1235 may be configured as or otherwise support a means for receiving the cancellation indication on a set of uplink control channel resources dedicated to the cancellation indication of an uplink control channel.

In some examples, the cancellation configuration transmission component 1240 may be configured as or otherwise support a means for transmitting a signal indicating a set of uplink control channel resources for transmitting the cancellation indication, the set of uplink control channel resources being periodic resources.

In some examples, to support receiving the cancellation indication, the cancellation indication reception component 1235 may be configured as or otherwise support a means for receiving the cancellation indication multiplexed with uplink control information on an uplink control channel, the uplink control information including channel state information, feedback information, or both.

In some examples, to support receiving the cancellation indication, the transmission parameter reception component 1255 may be configured as or otherwise support a means for receiving an indication of an updated set of one or more transmission parameters updated by the UE, the updated set of one or more transmission parameters including a packet size, a modulation and coding scheme, or both, where the updated set of one or more transmission parameters are updated from a respective one or more transmission parameters included in a downlink control information message.

In some examples, the decoding component 1270 may be configured as or otherwise support a means for updating a decoding procedure of the network entity for decoding the uplink message based on the indication of the updated set of one or more transmission parameters.

In some examples, the cancellation threshold component 1260 may be configured as or otherwise support a means for transmitting an indication of a threshold priority for the UE to use in determining whether to refrain from uplink transmissions, where receiving the cancellation indication is based on the uplink message have a priority less than the threshold priority.

In some examples, the uplink message reception component 1265 may be configured as or otherwise support a means for receiving the uplink message on a remaining portion of resources scheduled for the uplink message, the remaining portion of resources not preempted by the UE.

In some examples, the decoding component 1270 may be configured as or otherwise support a means for determining to refrain from decoding the set of resources of the uplink message based on the cancellation indication.

In some examples, the resource assignment component 1275 may be configured as or otherwise support a means for reassigning the set of resources based on the cancellation indication.

In some examples, the cancellation indication includes 14 bits.

Figure 13:
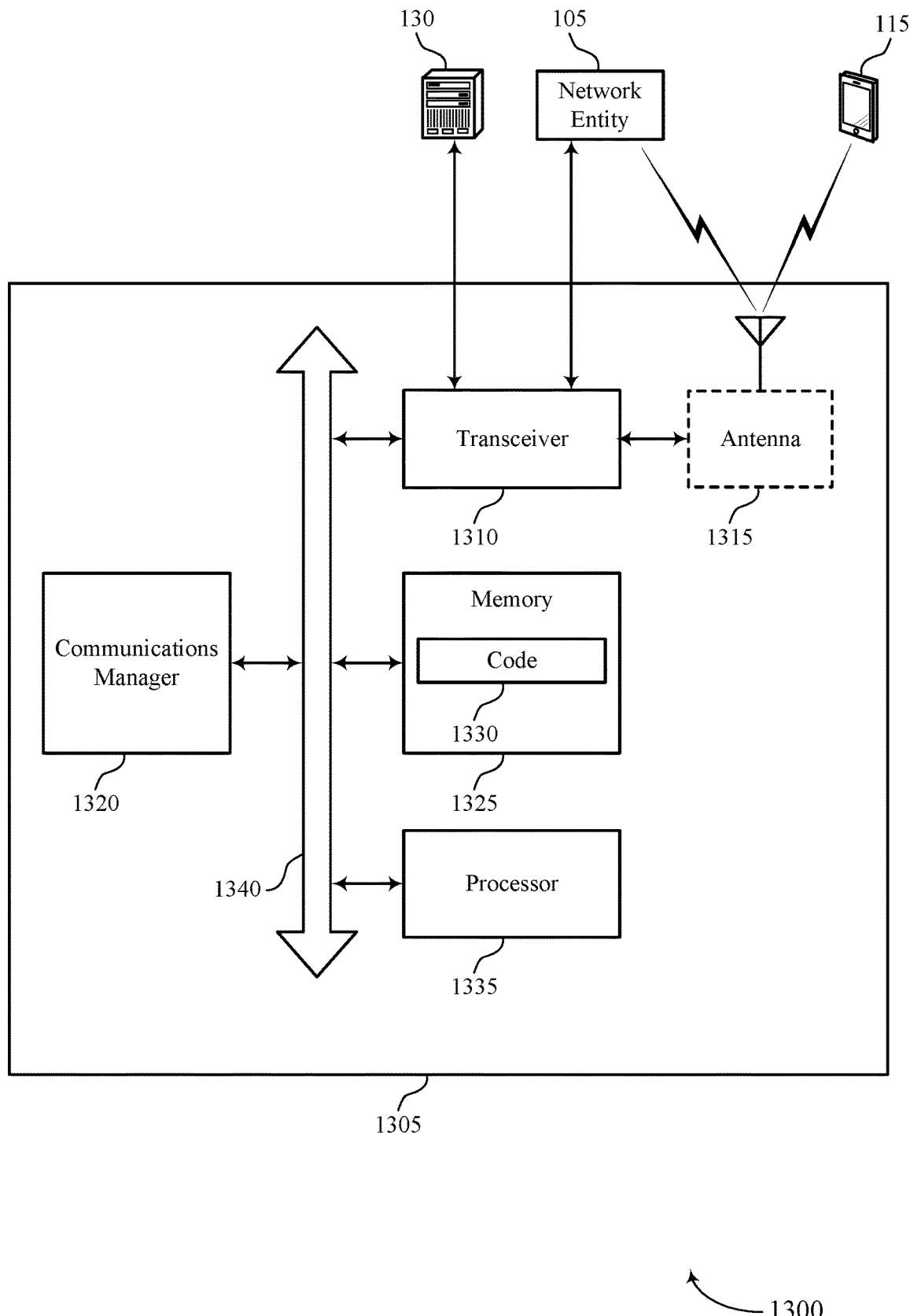
FIG. 13 shows a diagram of a system including a device that supports techniques for transmitting a cancellation indication in accordance with one or more aspects of the present disclosure.

FIG. 13 shows a diagram of a system 1300 including a device 1305 that supports techniques for transmitting a cancellation indication in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. The transceiver 1310, or the transceiver 1310 and one or more antennas 1315 or wired interfaces, where applicable, may be an example of a transmitter 1015, a transmitter 1115, a receiver 1010, a receiver 1110, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting techniques for transmitting a cancellation indication). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with ULEs 115 in cooperation with other network entities 105. In some examples, the communications manager 1320 may support an X2 interface within an LTE/LTE-A wireless communications network technology to provide communication between network entities 105.

The communications manager 1320 may support wireless communications at a network entity in accordance with examples as disclosed herein. For example, the communications manager 1320 may be configured as or otherwise support a means for transmitting a downlink message indicating a set of resources on which an uplink message is scheduled to be transmitted by a UE. The communications manager 1320 may be configured as or otherwise support a means for monitoring for a cancellation indication indicating that transmission of the uplink message on at least a portion of the set of resources is preempted based on a scheduling conflict at the UE. The communications manager 1320 may be configured as or otherwise support a means for receiving the cancellation indication based on monitoring for the cancellation indication.

By including or configuring the communications manager 1320 in accordance with examples as described herein, the device 1305 may support techniques for improved communication reliability, reduced latency, more efficient utilization of communication resources, and improved coordination between devices.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the processor 1335, the memory 1325, the code 1330, the transceiver 1310, or any combination thereof. For example, the code 1330 may include instructions executable by the processor 1335 to cause the device 1305 to perform various aspects of techniques for transmitting a cancellation indication as described herein, or the processor 1335 and the memory 1325 may be otherwise configured to perform or support such operations.

Figure 14:
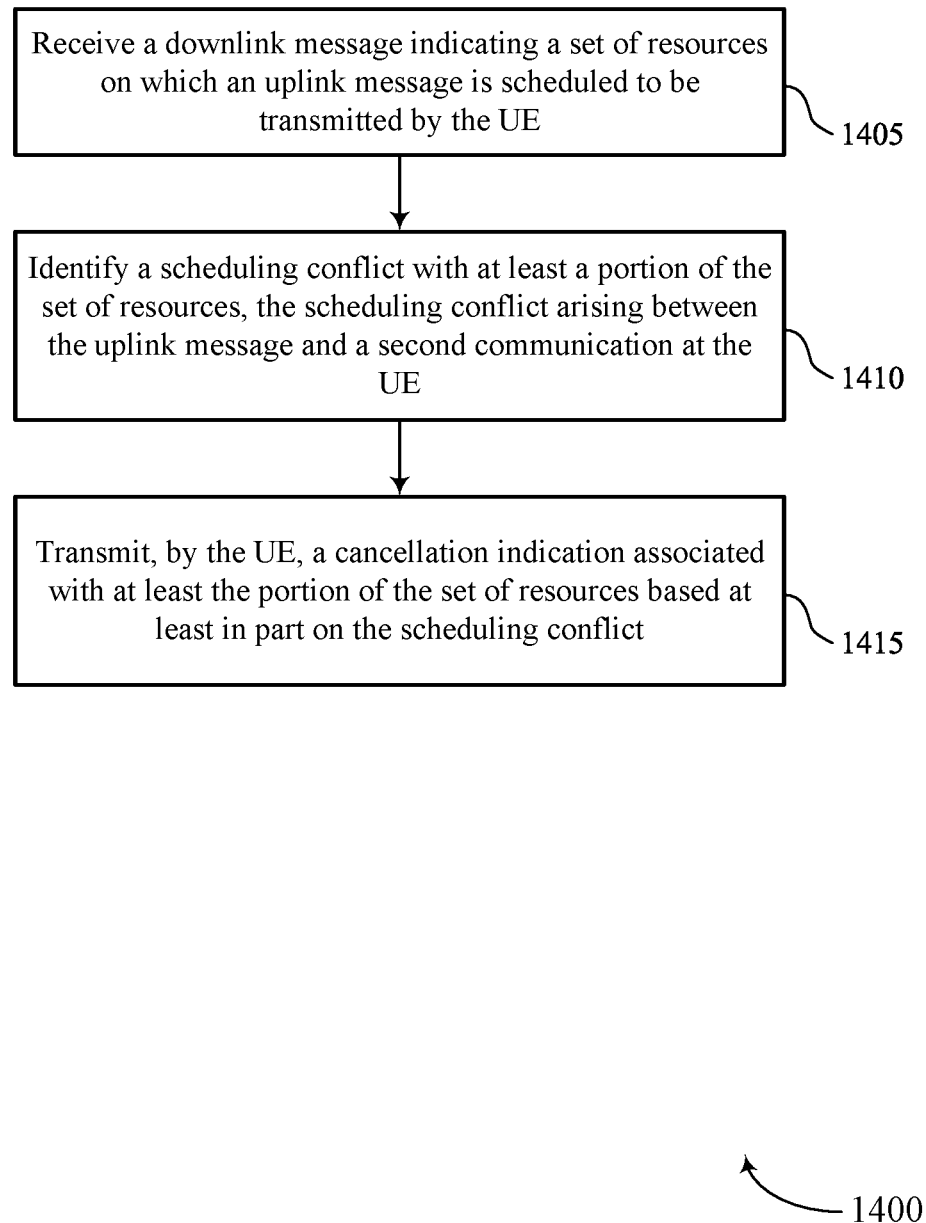
FIGS. 14 through 17 show flowcharts illustrating methods that support techniques for transmitting a cancellation indication in accordance with one or more aspects of the present disclosure.

FIG. 14 shows a flowchart illustrating a method 1400 that supports techniques for transmitting a cancellation indication in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving a downlink message indicating a set of resources on which an uplink message is scheduled to be transmitted by the UE. The operations of 1405 may be performed in accordance with examples as disclosed herein. In some examples, aspects of the operations of 1405 may be performed by a downlink message reception manager 825 as described with reference to FIG. 8.

At 1410, the method may include identifying a scheduling conflict with at least a portion of the set of resources, the scheduling conflict arising between the uplink message and a second communication at the UE. The operations of 1410 may be performed in accordance with examples as disclosed herein. In some examples, aspects of the operations of 1410 may be performed by a scheduling conflict identification manager 830 as described with reference to FIG. 8.

At 1415, the method may include transmitting, by the UE, a cancellation indication associated with at least the portion of the set of resources based on the scheduling conflict. The operations of 1415 may be performed in accordance with examples as disclosed herein. In some examples, aspects of the operations of 1415 may be performed by a cancellation indication manager 835 as described with reference to FIG. 8.

Figure 15:
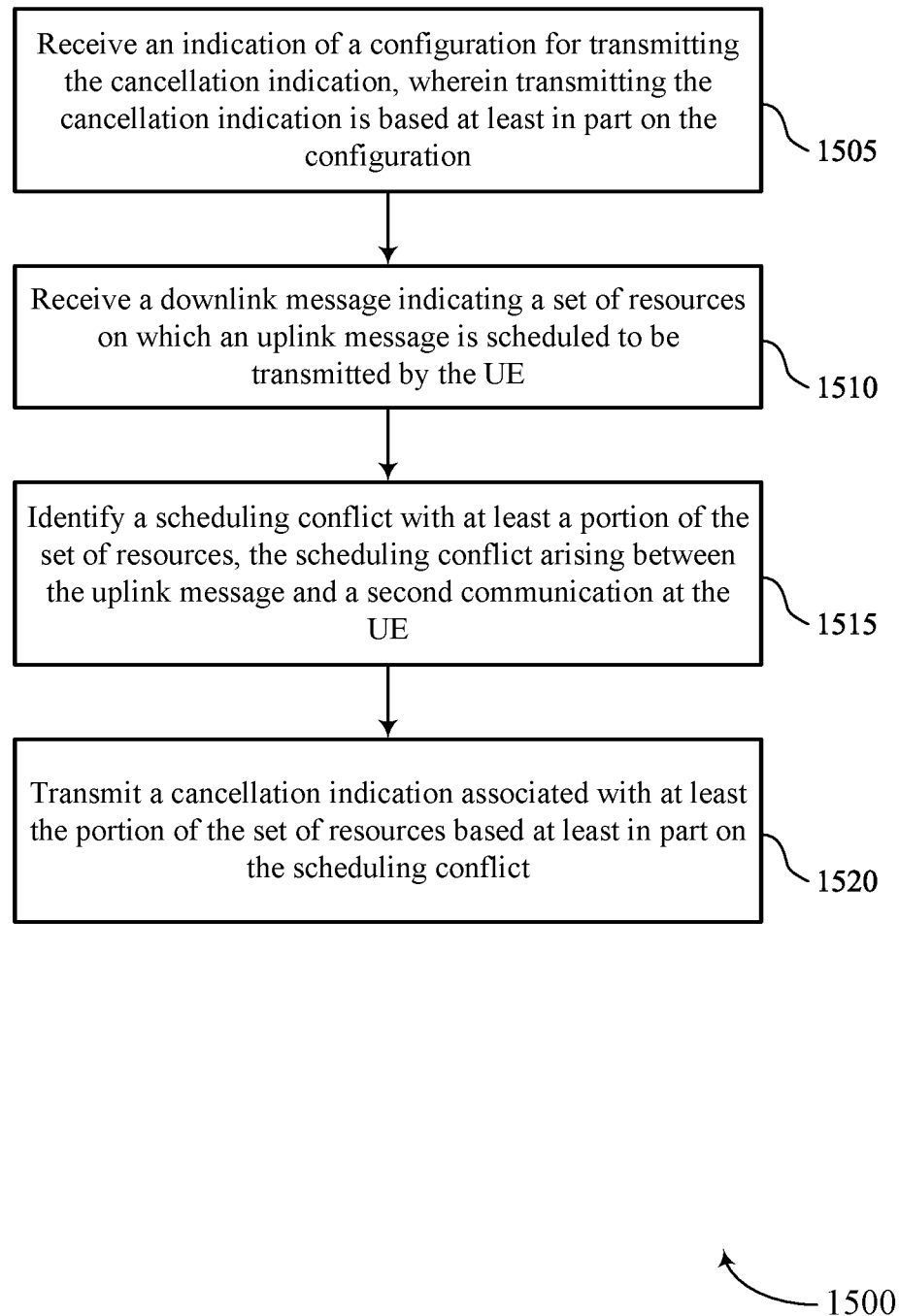

FIG. 15 shows a flowchart illustrating a method 1500 that supports techniques for transmitting a cancellation indication in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving an indication of a configuration for transmitting the cancellation indication, where transmitting the cancellation indication is based on the configuration. The operations of 1505 may be performed in accordance with examples as disclosed herein. In some examples, aspects of the operations of 1505 may be performed by a cancellation indication configuration manager 840 as described with reference to FIG. 8.

At 1510, the method may include receiving a downlink message indicating a set of resources on which an uplink message is scheduled to be transmitted by the UE. The operations of 1510 may be performed in accordance with examples as disclosed herein. In some examples, aspects of the operations of 1510 may be performed by a downlink message reception manager 825 as described with reference to FIG. 8.

At 1515, the method may include identifying a scheduling conflict with at least a portion of the set of resources, the scheduling conflict arising between the uplink message and a second communication at the UE. The operations of 1515 may be performed in accordance with examples as disclosed herein. In some examples, aspects of the operations of 1515 may be performed by a scheduling conflict identification manager 830 as described with reference to FIG. 8.

At 1520, the method may include transmitting, by the UE, a cancellation indication associated with at least the portion of the set of resources based on the scheduling conflict. The operations of 1520 may be performed in accordance with examples as disclosed herein. In some examples, aspects of the operations of 1520 may be performed by a cancellation indication manager 835 as described with reference to FIG. 8.

Figure 16:
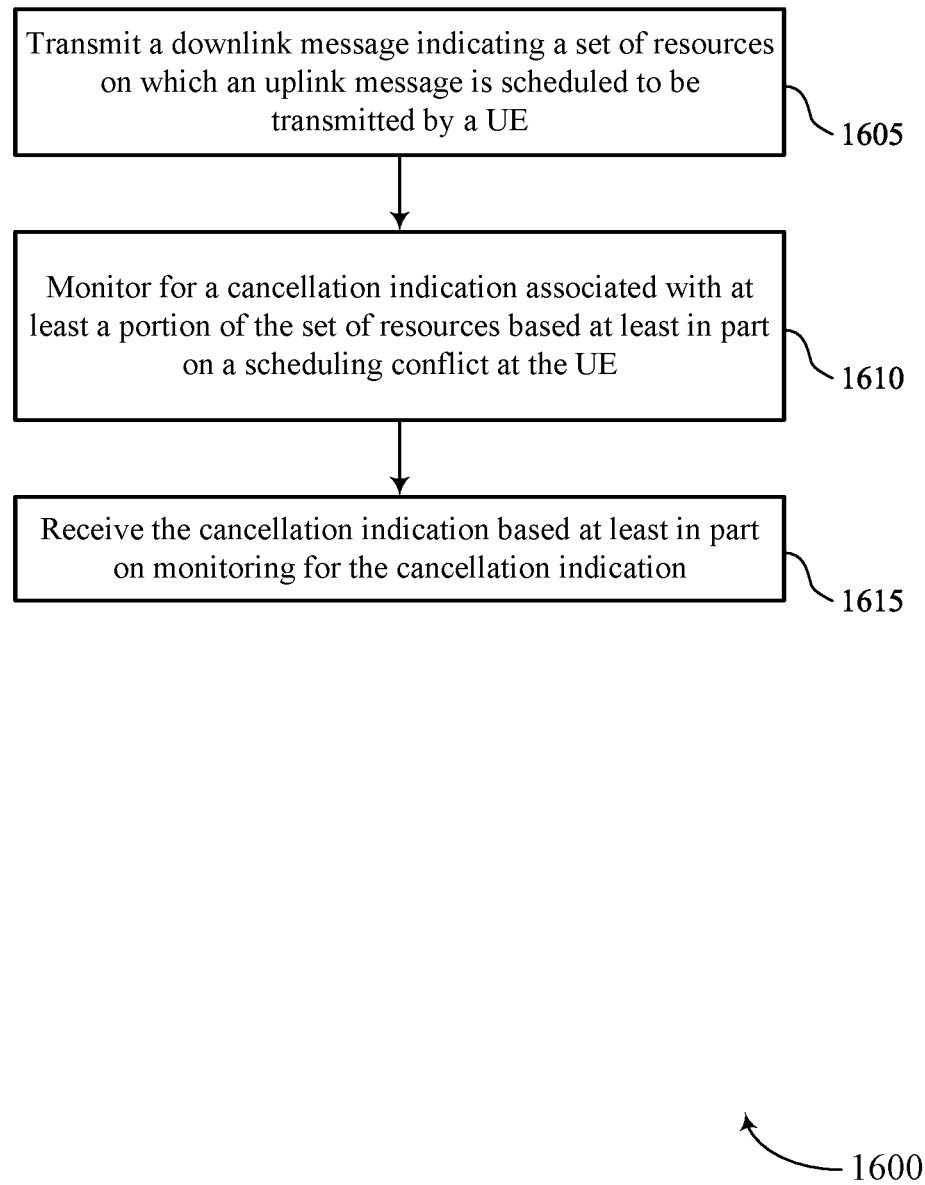

FIG. 16 shows a flowchart illustrating a method 1600 that supports techniques for transmitting a cancellation indication in accordance with one or more aspects of the present disclosure. The operations of the method 1600 may be implemented by a network entity or its components as described herein. For example, the operations of the method 1600 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1605, the method may include transmitting a downlink message indicating a set of resources on which an uplink message is scheduled to be transmitted by a UE. The operations of 1605 may be performed in accordance with examples as disclosed herein. In some examples, aspects of the operations of 1605 may be performed by a downlink message transmission component 1225 as described with reference to FIG. 12.

At 1610, the method may include monitoring for a cancellation indication indicating that transmission of the uplink message on at least a portion of the set of resources is preempted based on a scheduling conflict at the UE. The operations of 1610 may be performed in accordance with examples as disclosed herein. In some examples, aspects of the operations of 1610 may be performed by a cancellation indication monitoring component 1230 as described with reference to FIG. 12.

At 1615, the method may include receiving the cancellation indication based on monitoring for the cancellation indication. The operations of 1615 may be performed in accordance with examples as disclosed herein. In some examples, aspects of the operations of 1615 may be performed by a cancellation indication reception component 1235 as described with reference to FIG. 12.

Figure 17:
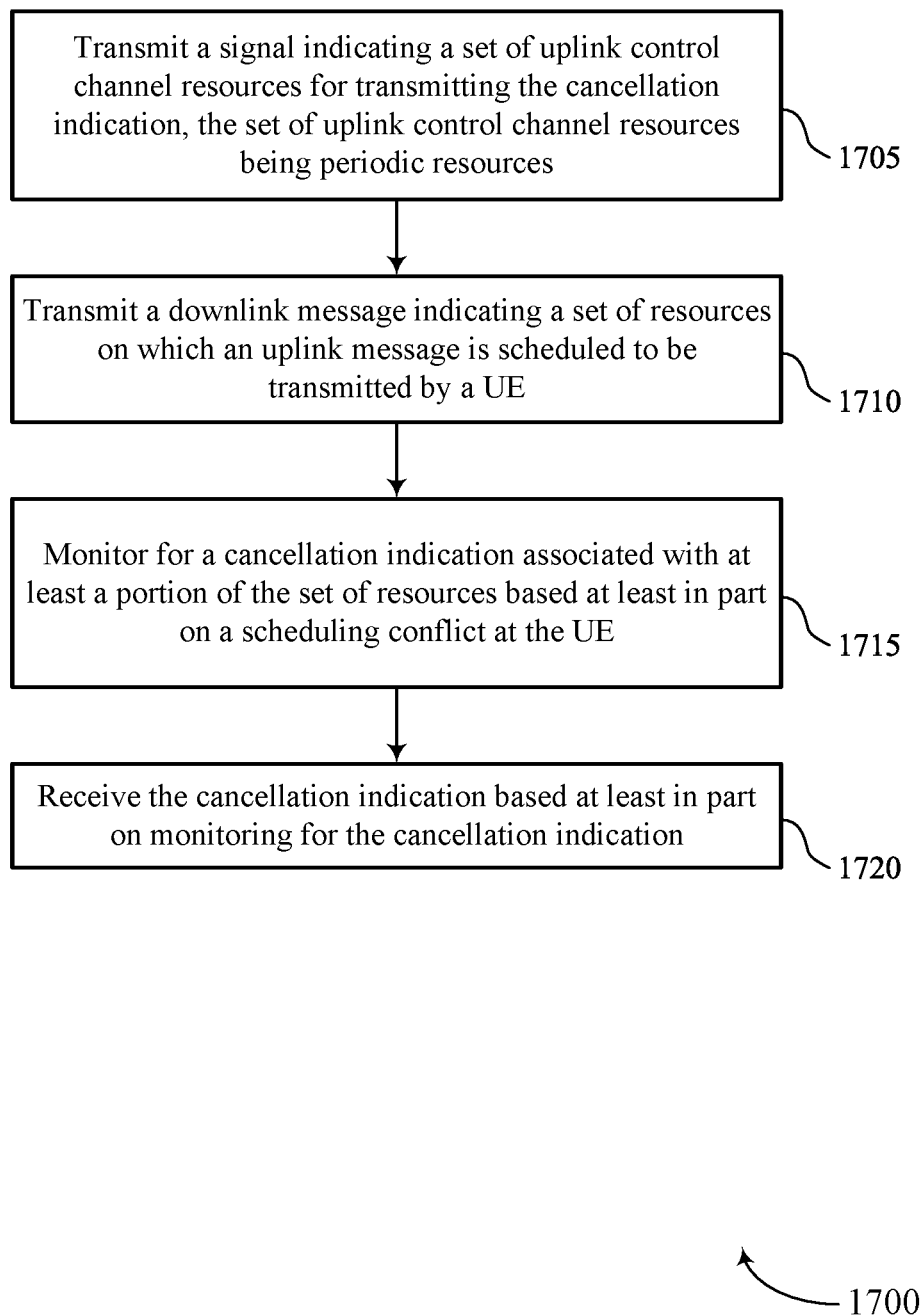

FIG. 17 shows a flowchart illustrating a method 1700 that supports techniques for transmitting a cancellation indication in accordance with one or more aspects of the present disclosure. The operations of the method 1700 may be implemented by a network entity or its components as described herein. For example, the operations of the method 1700 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1705, the method may include transmitting a signal indicating a set of uplink control channel resources for transmitting the cancellation indication, the set of uplink control channel resources being periodic resources. The operations of 1705 may be performed in accordance with examples as disclosed herein. In some examples, aspects of the operations of 1705 may be performed by a cancellation configuration transmission component 1240 as described with reference to FIG. 12.

At 1710, the method may include transmitting a downlink message indicating a set of resources on which an uplink message is scheduled to be transmitted by a UE. The operations of 1710 may be performed in accordance with examples as disclosed herein. In some examples, aspects of the operations of 1710 may be performed by a downlink message transmission component 1225 as described with reference to FIG. 12.

At 1715, the method may include monitoring for a cancellation indication indicating that transmission of the uplink message on at least a portion of the set of resources is preempted based on a scheduling conflict at the UE. The operations of 1715 may be performed in accordance with examples as disclosed herein. In some examples, aspects of the operations of 1715 may be performed by a cancellation indication monitoring component 1230 as described with reference to FIG. 12.

At 1720, the method may include receiving the cancellation indication based on monitoring for the cancellation indication. The operations of 1720 may be performed in accordance with examples as disclosed herein. In some examples, aspects of the operations of 1720 may be performed by a cancellation indication reception component 1235 as described with reference to FIG. 12.

The following provides an overview of aspects of the present disclosure:

Aspect 1: A method for wireless communications at a UE, comprising: receiving a downlink message indicating a set of resources on which an uplink message is scheduled to be transmitted by the UE; identifying a scheduling conflict with at least a portion of the set of resources, the scheduling conflict arising between the uplink message and a second communication at the UE; and transmitting, by the UE, a cancellation indication associated with at least the portion of the set of resources based at least in part on the scheduling conflict.

Aspect 2: The method of aspect 1, wherein transmitting the cancellation indication further comprises: transmitting the cancellation indication prior to the uplink message, the cancellation indication being an uplink cancellation indication (ULCI).

Aspect 3: The method of aspect 2, wherein transmitting the cancellation indication further comprises: transmitting the cancellation indication based at least in part on a duration between a last symbol of the cancellation indication and a first symbol of the uplink message satisfying a range, the range having a lower threshold and an upper threshold.

Aspect 4: The method of aspect 3, wherein the lower threshold is based at least in part on a decoding and processing capability of a network entity.

Aspect 5: The method of any of aspects 3 through 4, wherein the upper threshold is a maximum duration between the cancellation indication and the uplink message.

Aspect 6: The method of any of aspects 2 through 5, wherein transmitting the cancellation indication further comprises: transmitting the cancellation indication prior to the uplink message based at least in part on the UE being configured to prioritize transmitting the cancellation indication prior to the uplink message rather than after.

Aspect 7: The method of any of aspects 1 through 6, wherein transmitting the cancellation indication further comprises: transmitting the cancellation indication after the uplink message, the cancellation indication being an uplink pre-emption indication (ULPI).

Aspect 8: The method of aspect 7, wherein transmitting the cancellation indication further comprises: transmitting the cancellation indication based at least in part on a duration between a last symbol of the uplink message and a first symbol of the cancellation indication satisfying a threshold.

Aspect 9: The method of aspect 8, wherein the threshold is based at least in part on a defined duration for a network entity to monitor for the cancellation indication.

Aspect 10: The method of any of aspects 1 through 9, further comprising: receiving an indication of a configuration for transmitting the cancellation indication, wherein transmitting the cancellation indication is based at least in part on the configuration.

Aspect 11: The method of aspect 10, wherein the configuration indicates the cancellation indication is to be transmitted prior to the uplink message, after the uplink message, or either.

Aspect 12: The method of any of aspects 10 through 11, wherein the configuration indicates one or more timing parameters associated with transmitting the cancellation indication with respect to the uplink message.

Aspect 13: The method of any of aspects 1 through 12, wherein transmitting the cancellation indication further comprises: transmitting the cancellation indication as uplink control information included in the uplink message.

Aspect 14: The method of any of aspects 1 through 13, wherein transmitting the cancellation indication further comprises: transmitting an indication of a reason for canceling transmission of at least the portion of the set of resources of the uplink message, the reason being the second communication.

Aspect 15: The method of any of aspects 1 through 14, wherein transmitting the cancellation indication further comprises: transmitting an indication of the set of resources on which transmission of the uplink message is canceled, the indication comprising one or more time resources, one or more frequency resources, or a combination thereof.

Aspect 16: The method of any of aspects 1 through 15, wherein transmitting the cancellation indication further comprises: transmitting an indication of a period that the UE will refrain from transmitting the uplink message on the at least the portion of the set of resources.

Aspect 17: The method of any of aspects 1 through 16, wherein transmitting the cancellation indication further comprises: transmitting the cancellation indication on a set of uplink control channel resources dedicated to the cancellation indication of an uplink control channel.

Aspect 18: The method of any of aspects 1 through 17, further comprising: receiving a signal indicating a set of uplink control channel resources for transmitting the cancellation indication, the set of uplink control channel resources being periodic resources.

Aspect 19: The method of any of aspects 1 through 18, wherein transmitting the cancellation indication further comprises: transmitting the cancellation indication by multiplexing the cancellation indication with uplink control information an uplink control channel, the uplink control information comprising channel state information, feedback information, or both.

Aspect 20: The method of any of aspects 1 through 19, wherein transmitting the cancellation indication further comprises: transmitting an indication of an updated set of one or more transmission parameters updated by the UE, the updated set of one or more transmission parameters comprising a packet size, a modulation and coding scheme, or both, wherein the updated set of one or more transmission parameters are updated from a respective one or more transmission parameters included in a downlink control information message.

Aspect 21: The method of any of aspects 1 through 20, further comprising: receiving an indication of a threshold priority to use in determining whether to refrain from uplink transmissions, wherein transmitting the cancellation indication is based at least in part on the uplink message have a priority less than the threshold priority.

Aspect 22: The method of any of aspects 1 through 21, further comprising: transmitting the uplink message on a remaining portion of resources scheduled for the uplink message, the remaining portion of resources not canceled by the UE.

Aspect 23: The method of any of aspects 1 through 22, further comprising: communicating in accordance with the second communication on at least the portion of the set of resources.

Aspect 24: The method of any of aspects 1 through 23, wherein the cancellation indication comprises 14 bits.

Aspect 25: The method of any of aspects 1 through 24, wherein the second communication is associated with a higher priority than the uplink message.

Aspect 26: The method of any of aspects 1 through 25, wherein the second communication is associated with positioning, measurements, sensing, sidelink communications, Wi-Fi communications, Bluetooth communications, or a combination thereof.

Aspect 27: A method for wireless communications at a network entity, comprising: transmitting a downlink message indicating a set of resources on which an uplink message is scheduled to be transmitted by a UE; monitoring for a cancellation indication indicating that transmission of the uplink message on at least a portion of the set of resources is preempted based at least in part on a scheduling conflict at the UE; and receiving the cancellation indication based at least in part on monitoring for the cancellation indication.

Aspect 28: The method of aspect 27, wherein receiving the cancellation indication further comprises: receiving the cancellation indication prior to the uplink message, the cancellation indication being an uplink cancellation indication (ULCI).

Aspect 29: The method of aspect 28, wherein receiving the cancellation indication further comprises: receiving the cancellation indication in a range between a last symbol of the cancellation indication and a first symbol of the uplink message, the range having a lower threshold and an upper threshold.

Aspect 30: The method of aspect 29, wherein the lower threshold is based at least in part on a decoding and processing capability of the network entity.

Aspect 31: The method of any of aspects 29 through 30, wherein the upper threshold is a maximum duration between the cancellation indication and the uplink message.

Aspect 32: The method of any of aspects 27 through 31, wherein receiving the cancellation indication further comprises: receiving the cancellation indication after the uplink message, the cancellation indication being an uplink preemption indication (ULPI).

Aspect 33: The method of aspect 32, wherein receiving the cancellation indication further comprises: receiving the cancellation indication in accordance with a threshold duration between a last symbol of the uplink message and a first symbol of the cancellation indication.

Aspect 34: The method of aspect 33, wherein the threshold duration is based at least in part on a defined duration for the network entity to monitor for the cancellation indication.

Aspect 35: The method of any of aspects 27 through 34, further comprising: transmitting an indication of a configuration for transmitting the cancellation indication but the UE, wherein monitoring for the cancellation indication is based at least in part on the configuration.

Aspect 36: The method of aspect 35, wherein the configuration indicates the cancellation indication is to be transmitted prior to the uplink message, after the uplink message, or either.

Aspect 37: The method of any of aspects 35 through 36, wherein the configuration indicates one or more timing parameters associated with transmitting the cancellation indication with respect to the uplink message.

Aspect 38: The method of any of aspects 27 through 37, wherein receiving the cancellation indication further comprises: receiving the cancellation indication as uplink control information included in the uplink message.

Aspect 39: The method of any of aspects 27 through 38, wherein receiving the cancellation indication further comprises: receiving an indication of a reason for canceling transmission of at least the portion of the set of resources of the uplink message.

Aspect 40: The method of any of aspects 27 through 39, wherein receiving the cancellation indication further comprises: receiving an indication of the set of resources on which transmission of the uplink message is canceled, the indication comprising one or more time resources, one or more frequency resources, or a combination thereof.

Aspect 41: The method of any of aspects 27 through 40, wherein receiving the cancellation indication further comprises: receiving an indication of a period that the UE will refrain from transmitting the uplink message on the at least the portion of the set of resources.

Aspect 42: The method of any of aspects 27 through 41, wherein receiving the cancellation indication further comprises: receiving the cancellation indication on a set of uplink control channel resources dedicated to the cancellation indication of an uplink control channel.

Aspect 43: The method of any of aspects 27 through 42, further comprising: transmitting a signal indicating a set of uplink control channel resources for transmitting the cancellation indication, the set of uplink control channel resources being periodic resources.

Aspect 44: The method of any of aspects 27 through 43, wherein receiving the cancellation indication further comprises: receiving the cancellation indication multiplexed with uplink control information on an uplink control channel, the uplink control information comprising channel state information, feedback information, or both.

Aspect 45: The method of any of aspects 27 through 44, wherein receiving the cancellation indication further comprises: receiving an indication of an updated set of one or more transmission parameters updated by the UE, the updated set of one or more transmission parameters comprising a packet size, a modulation and coding scheme, or both, wherein the updated set of one or more transmission parameters are updated from a respective one or more transmission parameters included in a downlink control information message.

Aspect 46: The method of aspect 45, further comprising: updating a decoding procedure of the network entity for decoding the uplink message based at least in part on the indication of the updated set of one or more transmission parameters.

Aspect 47: The method of any of aspects 27 through 46, further comprising: transmitting an indication of a threshold priority for the UE to use in determining whether to refrain from uplink transmissions, wherein receiving the cancellation indication is based at least in part on the uplink message have a priority less than the threshold priority.

Aspect 48: The method of any of aspects 27 through 47, further comprising: receiving the uplink message on a remaining portion of resources scheduled for the uplink message, the remaining portion of resources not canceled by the UE.

Aspect 49: The method of any of aspects 27 through 48, further comprising: determining to refrain from decoding the set of resources of the uplink message based at least in part on the cancellation indication.

Aspect 50: The method of any of aspects 27 through 49, further comprising: reassigning the set of resources based at least in part on the cancellation indication.

Aspect 51: The method of any of aspects 27 through 50, wherein the cancellation indication comprises 14 bits.

Aspect 52: An apparatus for wireless communications, comprising a processor; memory coupled with the processor; and instructions stored in the memory and executable by the processor to cause the apparatus to perform a method of any of aspects 1 through 26.

Aspect 53: An apparatus for wireless communications, comprising at least one means for performing a method of any of aspects 1 through 26.

Aspect 54: A non-transitory computer-readable medium storing code for wireless communications, the code comprising instructions executable by a processor to perform a method of any of aspects 1 through 26.

Aspect 55: An apparatus for wireless communications, comprising a processor; memory coupled with the processor; and instructions stored in the memory and executable by the processor to cause the apparatus to perform a method of any of aspects 27 through 51.

Aspect 56: An apparatus for wireless communications, comprising at least one means for performing a method of any of aspects 27 through 51.

Aspect 57: A non-transitory computer-readable medium storing code for wireless communications, the code comprising instructions executable by a processor to perform a method of any of aspects 27 through 51.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
  receiving a downlink message indicating a set of resources on which an uplink message is scheduled to be transmitted by the UE;

identifying a scheduling conflict with at least a portion of the set of resources, the scheduling conflict arising between the uplink message and a second communication at the UE; and transmitting, according to a timing condition, a cancellation indication associated with at least the portion of the set of resources based at least in part on the scheduling conflict, wherein the timing condition comprises transmitting the cancellation indication within a predetermined time of the uplink message, the predetermined time comprising a first time between a last symbol of the cancellation indication and a first symbol of the uplink message, a second time between a last symbol of the uplink message and a first symbol of the cancellation indication, or both.

2. The method of claim 1, wherein transmitting the cancellation indication further comprises:

transmitting the cancellation indication prior to the uplink message, the cancellation indication being an uplink cancellation indication (ULCI).

3. The method of claim 2, wherein:

the first time comprises a range having a lower threshold and an upper threshold.

4. The method of claim 1, wherein transmitting the cancellation indication further comprises:

transmitting the cancellation indication after the uplink message, the cancellation indication being an uplink pre-emption indication (ULPI).

5. The method of claim 1, further comprising:

receiving an indication of a configuration for transmitting the cancellation indication, wherein transmitting the cancellation indication is based at least in part on the configuration.

6. The method of claim 1, wherein transmitting the cancellation indication further comprises:

transmitting the cancellation indication as uplink control information included in the uplink message.

7. The method of claim 1, wherein transmitting the cancellation indication further comprises:

transmitting an indication of a reason for canceling transmission of at least the portion of the set of resources of the uplink message, the reason being the second communication.

8. The method of claim 1, wherein transmitting the cancellation indication further comprises:

transmitting an indication of the set of resources on which transmission of the uplink message is canceled, the indication comprising one or more time resources, one or more frequency resources, or a combination thereof.

9. The method of claim 1, wherein transmitting the cancellation indication further comprises:

transmitting an indication of a period that the UE will refrain from transmitting the uplink message on the at least the portion of the set of resources.

10. The method of claim 1, wherein transmitting the cancellation indication further comprises:

transmitting the cancellation indication on a set of uplink control channel resources dedicated to the cancellation indication of an uplink control channel.

11. The method of claim 1, further comprising:

receiving a signal indicating a set of uplink control channel resources for transmitting the cancellation indication, the set of uplink control channel resources being periodic resources.

12. The method of claim 1, wherein transmitting the cancellation indication further comprises:

transmitting the cancellation indication by multiplexing the cancellation indication with uplink control information an uplink control channel, the uplink control information comprising channel state information, feedback information, or both.

13. The method of claim 1, wherein transmitting the cancellation indication further comprises:

transmitting an indication of an updated set of one or more transmission parameters updated by the UE, the updated set of one or more transmission parameters comprising a packet size, a modulation and coding scheme, or both, wherein the updated set of one or more transmission parameters are updated from a respective one or more transmission parameters included in a downlink control information message.

14. The method of claim 1, further comprising:

receiving an indication of a threshold priority to use in determining whether to refrain from uplink transmissions, wherein transmitting the cancellation indication is based at least in part on the uplink message have a priority less than the threshold priority.

15. An apparatus comprising a user equipment (UE) for wireless communications, comprising:

one or more processors;

memory coupled with the one or more processors; and instructions stored in the memory and executable by the one or more processors to cause the apparatus to:

receive a downlink message indicating a set of resources on which an uplink message is scheduled to be transmitted by the user equipment (UE);

identify a scheduling conflict with at least a portion of the set of resources, the scheduling conflict arising between the uplink message and a second communication at the UE; and transmit, according to a timing condition, a cancellation indication associated with at least the portion of the set of resources based at least in part on the scheduling conflict, wherein the timing condition comprises transmitting the cancellation indication within a predetermined time of the uplink message, the predetermined time comprising a first time between a last symbol of the cancellation indication and a first symbol of the uplink message, a second time between a last symbol of the uplink message and a first symbol of the cancellation indication, or both.

16. The apparatus of claim 15, wherein the instructions to transmit the cancellation indication are further executable by the one or more processors to cause the apparatus to:

transmit the cancellation indication prior to the uplink message, the cancellation indication being an uplink cancellation indication (ULCI).

17. The apparatus of claim 16, wherein the first time comprises a range having a lower threshold and an upper threshold.

18. The apparatus of claim 15, wherein the instructions to transmit the cancellation indication are further executable by the one or more processors to cause the apparatus to:

transmit the cancellation indication after the uplink message, the cancellation indication being an uplink pre-emption indication (ULPI).

19. The apparatus of claim 15, wherein the instructions are further executable by the one or more processors to cause the apparatus to:

receive an indication of a configuration for transmitting the cancellation indication, wherein transmitting the cancellation indication is based at least in part on the configuration.

20. The apparatus of claim 15, wherein the instructions to transmit the cancellation indication are further executable by the one or more processors to cause the apparatus to:
transmit the cancellation indication as uplink control information included in the uplink message.

21. The apparatus of claim 15, wherein the instructions to transmit the cancellation indication are further executable by the one or more processors to cause the apparatus to:
transmit an indication of a reason for canceling transmission of at least the portion of the set of resources of the uplink message, the reason being the second communication.

22. The apparatus of claim 15, wherein the instructions to transmit the cancellation indication are further executable by the one or more processors to cause the apparatus to:
transmit an indication of the set of resources on which transmission of the uplink message is canceled, the indication comprising one or more time resources, one or more frequency resources, or a combination thereof.

23. The apparatus of claim 15, wherein the instructions to transmit the cancellation indication are further executable by the one or more processors to cause the apparatus to:
transmit an indication of a period that the UE will refrain from transmitting the uplink message on the at least the portion of the set of resources.

24. The apparatus of claim 15, wherein the instructions to transmit the cancellation indication are further executable by the one or more processors to cause the apparatus to:
transmit the cancellation indication on a set of uplink control channel resources dedicated to the cancellation indication of an uplink control channel.

25. The apparatus of claim 15, wherein the instructions are further executable by the one or more processors to cause the apparatus to:
receive a signal indicating a set of uplink control channel resources for transmitting the cancellation indication, the set of uplink control channel resources being periodic resources.

26. The apparatus of claim 15, wherein the instructions to transmit the cancellation indication are further executable by the one or more processors to cause the apparatus to:
transmit the cancellation indication by multiplexing the cancellation indication with uplink control information an uplink control channel, the uplink control information comprising channel state information, feedback information, or both.

27. The apparatus of claim 15, wherein the instructions to transmit the cancellation indication are further executable by the one or more processors to cause the apparatus to:
transmit an indication of an updated set of one or more transmission parameters updated by the UE, the updated set of one or more transmission parameters comprising a packet size, a modulation and coding scheme, or both, wherein the updated set of one or more transmission parameters are updated from a respective one or more transmission parameters included in a downlink control information message.

28. The apparatus of claim 15, wherein the instructions are further executable by the one or more processors to cause the apparatus to:
receive an indication of a threshold priority to use in determining whether to refrain from uplink transmissions, wherein transmitting the cancellation indication is based at least in part on the uplink message have a priority less than the threshold priority.

29. An apparatus for wireless communications, comprising:
means for receiving a downlink message indicating a set of resources on which an uplink message is scheduled to be transmitted by a user equipment (UE);
means for identifying a scheduling conflict with at least a portion of the set of resources, the scheduling conflict arising between the uplink message and a second communication at the UE; and
means for transmitting, according to a timing condition, a cancellation indication associated with at least the portion of the set of resources based at least in part on the scheduling conflict, wherein the timing condition comprises transmitting the cancellation indication within a predetermined time of the uplink message, the predetermined time comprising a first time between a last symbol of the cancellation indication and a first symbol of the uplink message, a second time between a last symbol of the uplink message and a first symbol of the cancellation indication, or both.

30. A non-transitory computer-readable medium storing code for wireless communications, the code comprising instructions executable by one or more processors to:
receive a downlink message indicating a set of resources on which an uplink message is scheduled to be transmitted by a user equipment (UE);
identify a scheduling conflict with at least a portion of the set of resources, the scheduling conflict arising between the uplink message and a second communication at the UE; and
transmit, according to a timing condition, a cancellation indication associated with at least the portion of the set of resources based at least in part on the scheduling conflict, wherein the timing condition comprises transmitting the cancellation indication within a predetermined time of the uplink message, the predetermined time comprising a first time between a last symbol of the cancellation indication and a first symbol of the uplink message, a second time between a last symbol of the uplink message and a first symbol of the cancellation indication, or both.

* * * * *